(12) United States Patent
Misaka et al.

(10) Patent No.: US 7,103,870 B2
(45) Date of Patent: Sep. 5, 2006

(54) METHOD FOR PLANNING LAYOUT FOR LSI PATTERN, METHOD FOR FORMING LSI PATTERN AND METHOD FOR GENERATING MASK DATA FOR LSI

(75) Inventors: Akio Misaka, Osaka (JP); Shinji Odanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 299 days.

(21) Appl. No.: 10/704,594

(22) Filed: Nov. 12, 2003

(65) Prior Publication Data
US 2004/0107410 A1 Jun. 3, 2004

Related U.S. Application Data

(62) Division of application No. 09/517,617, filed on Mar. 3, 2000, now Pat. No. 6,691,297.

(30) Foreign Application Priority Data
Mar. 4, 1999 (JP) ................................. 11-057259

(51) Int. Cl.
*G06F 17/50* (2006.01)
(52) U.S. Cl. ............................. 716/21; 716/10; 716/19; 430/5; 430/30
(58) Field of Classification Search .............. 716/8–11, 716/19–21; 430/5, 30
See application file for complete search history.

(56) References Cited

U.S. PATENT DOCUMENTS

| 5,994,009 A | 11/1999 | Tzu et al. |
| 6,009,251 A | 12/1999 | Ho et al. |
| 6,077,310 A | 6/2000 | Yamamoto et al. |
| 6,453,452 B1 | 9/2002 | Chang et al. |
| 6,691,297 B1 * | 2/2004 | Misaka et al. ................. 716/21 |

FOREIGN PATENT DOCUMENTS

| JP | 8-76348 | 3/1996 |
| JP | 8-202020 | 8/1996 |
| JP | 08-305001 | 11/1996 |
| JP | 9-319067 | 12/1997 |
| JP | 10-284608 | 10/1998 |
| JP | 10-326010 | 12/1998 |
| JP | 11-121345 | 4/1999 |

* cited by examiner

*Primary Examiner*—Vuthe Siek
(74) *Attorney, Agent, or Firm*—McDermott Will & Emery LLP

(57) ABSTRACT

First, multiple circuit patterns, which will eventually make an LSI, are designed on a cell-by-cell basis, and an initial placement is made for the circuit patterns designed. Next, optical proximity corrections are performed on at least two of the circuit patterns that have been initially placed to be adjacent to or cross each other, thereby forming optical proximity corrected patterns out of the adjacent or crossing circuit patterns. Then, it is determined whether or not optical proximity corrections can be performed effectively using the corrected patterns. If the effectiveness of the corrections is negated, a design rule defining the circuit patterns is changed to make the corrections effective. Thereafter, the initially placed circuit patterns are placed again in accordance with the design rule changed.

12 Claims, 17 Drawing Sheets

METHOD FOR PLANNING LAYOUT FOR LSI PATTERN, METHOD FOR FORMING LSI PATTERN AND METHOD FOR GENERATING MASK DATA FOR LSI

This application is a division of application Ser. No. 09/517,617 filed Mar. 3, 2000 which is now U.S. Pat. No. 6,691,297.

BACKGROUND OF THE INVENTION

The present invention relates to a method for planning a layout for an LSI pattern with optical proximity corrections ensured, a method for generating mask data and a method for forming an LSI pattern using these methods.

Recently, as a semiconductor large-scale integrated circuit (LSI) device has been downsized, a photolithographic step, which is one of the main process steps of an LSI fabrication process, has been affected by optical proximity effects more and more seriously. Specifically, a deviation of a feature size of a pattern actually transferred onto a resist from that of a mask pattern formed on a reticle has almost reached a non-negligible level. That is to say, if the feature size of an originally designed pattern is automatically applied to the mask pattern, then the size of the actually transferred pattern is likely to deviate from the originally designed one. This problem is particularly noticeable in a transistor, which plays a key role in determining the operability of an LSI. In this specification, a feature size of a pattern originally designed will be called a "designed size", that of a pattern formed on a reticle or mask a "mask size" and that of a pattern actually transferred onto a resist an "actual size", respectively.

Furthermore, every time an LSI of a new generation alternates with one of an older generation, the feature size of the LSI should be reduced discontinuously. For example, process technology of 0.18 µm generation has lately alternated with that of 0.25 µm generation. In this manner, a transistor feature size like the gate length thereof is usually reduced by about 70%. Whenever the gate length is reduced in this manner, one expects that the area of a cell implementing a circuit with the same function can also be reduced by about 50%, which is the square of 70%. This shrinkage rate is achievable by introducing a state-of-the-art exposure system using a radiation source with an even shorter wavelength or by improving the lithographic process itself.

These days, however, it has become more and more difficult to attain this shrinkage rate just by introducing a new system or improving the process. This is because the increase in deviation of an actual size from a mask size often prevents design rules, which are defined to ensure proper circuit operation, from achieving the 70% shrinkage rate. Examples of the design rules include the size of an extension of a gate and a contact margin.

FIG. 20(a) illustrates an originally designed pattern 100A and an actually transferred pattern 100B of an ordinary field effect transistor (FET). As shown in FIG. 20(a), the designed pattern 100A includes a gate pattern 101 to be shaped into a gate layer and an active layer pattern 102 to be shaped into an active layer. In the actually transferred pattern 100B, the width of the gate pattern 111 is smaller than its originally designed size, and both edge portions 111a of the gate pattern 111 no longer exist. If the portions of the gate pattern 111 overlapping with the active layer pattern 112 have been partially lost this way, then the transistor cannot operate normally.

To solve such a problem, extensions 101a are provided for both edges of the gate pattern 101 so as to extend from the active layer pattern 102 in the gate width direction as shown in FIG. 20(b). As the size of a line pattern, which is called a "gate length 101b" decreases, the areas of the edge portions of the gate pattern 101 to be lost increase. In other words, the size 110c of the extensions 101a does not decrease proportionally to the gate length 101b. Accordingly, when the gate length 101b is to be reduced, the size 101c of the extensions 101a of the gate pattern 101 should be increased to ensure proper operation for the transistor. Thus, it has become more and more difficult for the design rule concerning the extension size 101c to achieve the 70% shrinkage rate.

In spite of the circumstances such as these, the design rule is still defined based on the deviation of an actual size from a mask size. For example, the design rule is defined by the 70% shrinkage rate compared to the previous generation. Thus, to reduce the total area of the circuit patterns, the design rule defined based on the 70% shrinkage rate is prioritized and applied to even a pattern that cannot satisfy the design rule completely, e.g., the extension size 101c of the gate pattern 101.

Thereafter, a cell library is made up of a plurality of circuit patterns that have been designed in accordance with the design rule. LSI chip data is generated using the cell library to determine final conditions for the fabrication process. Based on these final process conditions, the deviation of an actual size from a mask size, which has been caused due to proximity effects, is estimated, thereby generating data for a mask layout that has been modified to eliminate the deviation of the actual size from the designed one. In this case, the actual sizes are estimated relative to the mask sizes using empirical models that reflect various conditions for estimating the actual sizes under predefined process conditions.

For example, in a portion of a circuit pattern where an actual size is thinner than its mask size, the mask size is thickened compared to the originally designed one. Conversely, in a portion of a circuit pattern where an actual size is thicker than its mask size, the mask size is thinned compared to the originally designed one. A mask pattern that is formed in view of optical proximity effects in this manner is called an "optical proximity corrected (OPC)" pattern.

According to the prior art method for generating LSI mask data, however, it is not until all the circuit patterns have been defined (i.e., while mask pattern data is being generated) that the OPC patterns are made. Thus, the OPC patterns could not be formed in some cases.

For example, consider a case shown in FIG. 20(a) where the edges of the gate pattern 101 disappear. In such a situation, even if the mask size for the extensions 101a of the gate pattern 101 should be corrected to match its actual size with the size originally designed for the circuit pattern, the size 101c of the extensions 101a could not be changed. For instance, this size change is impermissible if the space between the extensions 101a and surrounding patterns thereof is of the required minimum size defined by the resolution limit.

Furthermore, the prior art method for generating mask data has various drawbacks including the following:

(1) A design rule defined without taking proximity effect corrections into account would result in an excessively increased mask size.

The proximity effects on the gate pattern can be compensated for by various techniques other than the extension of the extensions. For example, where gates are laid out with relatively wide space interposed therebetween, a hammerhead pattern may be added to each extension of a gate pattern that is not located over the active layer of a transistor. This hammerhead pattern does not extend the extension in the gate width direction, but expands only the edges of the extension in the gate longitudinal direction, thereby preventing the actual size of the gate pattern from shrinking too much at its edges in the gate width direction. In this manner, the proximity effect corrections can be made not only by compensating for the deviation of the actual size from the mask size but also by minimizing the deviation. Accordingly, if the size deviation was simply expected and a design rule was defined based on the result without estimating how much the deviation can be reduced by forming an OPC pattern, then the mask size determined would be unnecessarily large.

(2) In general, circuit patterns are made in accordance with a basic pattern placement rule and process conditions are defined to minimize a variation in sizes of patterns actually formed and a deviation of each actual size from its mask size. However, another pattern placement rule, which is different from that applied to the definition of the process conditions, is applied to OPC patterns. Thus, the process conditions defined are not always best suited to the placement rule for the OPC patterns.

Suppose circuit patterns have been defined with a pattern-to-pattern space minimized but the actual size of the space is larger than the originally designed one. In such a case, to make the size of the space between OPC patterns smaller than that once defined for the circuit patterns, the minimum space between the OPC patterns should be reduced from the minimum pattern-to-pattern space that was defined when the process conditions were determined. Accordingly, if the process conditions did not change at all, then the size of a pattern actually formed using the OPC pattern should almost match the size originally designed for the circuit pattern. Actually, though, the process conditions are variable during the fabrication process, thus making the actual size non-uniform due to the variation. This is because if an actual size is reduced, then optimum process conditions usually change to minimize the size non-uniformity due to the variation of process conditions. In an extreme case, even a basic exposure method such as super-resolution exposure or phase shift masking should be changed to suppress the size non-uniformity.

(3) Although final process conditions for an LSI are determined just before the actual fabrication thereof, details of OPC patterns cannot be defined until specific process conditions are determined.

In developing an LSI, design of circuit patterns to be registered at a cell library is started as early as more than 6 months before the fabrication of the LSI. However, since the process conditions are determined just before the fabrication, details of OPC patterns cannot be defined at an early stage. Accordingly, it is difficult to design circuit patterns for a cell library in view of final OPC patterns to solve the problem (1).

(4) An OPC pattern is made based on only a deviation of an actual size obtained under predetermined process conditions from a size originally designed for a circuit pattern. A design rule, which is ordinarily defined such that a feature size of the previous generation should be reduced by 70%, is applied to the circuit pattern. Although the 70% shrinkage may be effectively applicable to some LSI's, other LSI's may require a different shrinkage rate.

For example, in making an LSI with the same function and the same chip area based on a new design rule, that LSI might be obtained at a shrinkage rate of 50%. Furthermore, in an actual circuit pattern, the actual size does not have to exactly match the originally designed one in every part of the circuit. That is to say, some parts of a circuit may require an exact match between the actual and designed sizes to ensure proper operation for the circuit, but other parts thereof may allow some size deviation. Accordingly, if a circuit is designed such that all the actual sizes thereof are reduced by 70% compared to the older generation, then unnecessarily stringent conditions will be imposed on the LSI fabrication, thus making it much harder to obtain a desired LSI.

SUMMARY OF THE INVENTION

An object of the present invention is performing optical proximity corrections effectively in such a manner as to downsize an LSI just as intended and to form circuit patterns that will make the LSI fully operative.

To achieve this object, according to an inventive method for planning a layout for an LSI pattern or generating mask data for an LSI, optical proximity corrected patterns are formed as mask data for circuit patterns being designed. Also, a design rule is defined to make the corrected patterns effectively applicable while the circuit patterns are being designed.

Specifically, an inventive method for planning a layout for an LSI pattern includes the steps of: designing circuit patterns included in the LSI pattern; making an initial placement for the circuit patterns designed; performing optical proximity corrections on at least two of the circuit patterns that have been initially placed to be adjacent to or cross each other, thereby forming optical proximity corrected patterns out of the adjacent or crossing circuit patterns; and evaluating effectiveness of the proximity corrections. If the effectiveness of the corrections is negated, the method further includes the steps of: changing a design rule defining the circuit patterns to make the corrections effective; and making a re-placement for the initially placed circuit patterns in accordance with the design rule changed.

According to the inventive method for planning an LSI pattern layout, optical proximity corrected patterns are generated first, and then a design rule defining circuit patterns is changed to make the corrections effective. Thus, the present invention eliminates a situation, where optical proximity corrections are no longer applicable to a mask pattern formed by transferring a designed pattern, as is often the case with the prior art.

In one embodiment of the present invention, the step of forming the corrected patterns preferably includes the step of setting specifications of the corrected patterns to be made. The step of evaluating preferably includes the step of changing the specifications to make the corrections effective if the effectiveness of the corrections is negated.

In another embodiment of the present invention, the step of making the re-placement preferably includes the step of forming multiple re-placement patterns and selecting one of the re-placement patterns that minimizes a total circuit area.

In still another embodiment, the method may further include the step of defining the design rule such that the circuit patterns can be laid out to make the corrections effective. The step of making the initial placement or the step of making the re-placement may include the step of placing the circuit patterns in accordance with the design rule.

In this case, the step of defining the design rule preferably includes the step of defining multiple design rules and selecting one of the design rules that minimizes a total circuit area.

In an alternate embodiment, the method may further include the steps of: setting specifications of the corrected patterns to be made; defining a rule of placing the corrected patterns such that the proximity corrections can be performed effectively using the corrected patterns; and forming the corrected patterns according to the specifications of the corrected patterns to be made and on the rule of placing the corrected patterns, thereby defining the design rule.

In this case, the method may further include the steps of: evaluating effectiveness of the proximity corrections for the circuit patterns that have been placed in accordance with the design rule; and modifying the specifications of the corrected patterns to be made or the rule of placing the corrected patterns to make the corrections effective if the effectiveness of the corrections is negated.

In still another embodiment, the step of evaluating may include the step of determining whether or not an expected actual size falls within a predetermined range by performing a process simulation including at least one of lithography and etching process steps.

In this case, the lithography process step in the process simulation preferably includes determining whether or not the expected actual size falls within the predetermined range even if an exposure dose or focus has changed so much as to exceed a process margin range.

Alternatively, it may be determined in the process simulation whether or not an expected size of a transistor in a gate longitudinal direction falls within the predetermined range.

As another alternative, it may also be determined in the process simulation whether or not an expected length of a portion of a transistor gate extending from an active layer in a gate width direction falls within the predetermined range.

A first inventive LSI pattern forming method includes the steps of: a) designing circuit patterns included in the LSI pattern; b) making an initial placement for the circuit patterns designed; c) performing optical proximity corrections on at least two of the circuit patterns that have been initially placed to be adjacent to or cross each other, thereby forming optical proximity corrected patterns out of the adjacent or crossing circuit patterns; and d) evaluating effectiveness of the proximity corrections under predetermined process conditions. If the effectiveness of the corrections is negated, then the method further includes the steps of: e) changing a design rule defining the circuit patterns to make the corrections effective; f) making a replacement for the initially placed circuit patterns in accordance with the design rule changed; g) producing a mask using the corrected patterns; and h) defining the circuit patterns on a semiconductor substrate under the predetermined process conditions by using the mask produced.

According to the first inventive LSI pattern forming method, circuit patterns (i.e., actually transferred patterns) are formed on a resist film, for example, using a mask that has been produced by the inventive LSI pattern layout planning method. Thus, these circuit patterns ensure proper operation for the resultant circuit.

In one embodiment of the present invention, the first LSI pattern forming method may further include the step of estimating process yield expectedly attainable when the produced mask is used under the predetermined process conditions after the step g) has been performed. And if the estimate is short of a target value, the method may further include the step of modifying the predetermined process conditions to make the estimate reach the target value and repeatedly performing the steps a) through g).

A first inventive LSI mask data generating method includes the step of a) classifying multiple circuit patterns included in the LSI into first and second groups of corrected patterns. Each said corrected pattern of the first group will not be changed in shape even when process conditions are modified, while each said corrected pattern of the second group will be changed in shape if the process conditions are modified. The method further includes the steps of: b) generating cell-level optical proximity corrected pattern data from the first group of corrected patterns when the circuit patterns are designed; and c) generating chip-level optical proximity corrected pattern data from the second group of corrected patterns when chip data is generated from the circuit patterns.

According to the first inventive LSI mask data generating method, even if optical proximity corrections are made in advance on the first group of corrected patterns, those patterns of the first group can be registered at a library. Also, since the first group of corrected patterns greatly affects cell areas, the corrected patterns are determined at a cell level, i.e., while the cells are being designed. Accordingly, the areas of the cells to be produced finally based on the corrected patterns can be estimated accurately. Furthermore, since the optical proximity corrections can be made on a cell-by-cell basis, the specifications of optical proximity corrected patterns to be made can be determined for each cell or block.

In one embodiment of the present invention, the step b) may include the step of evaluating effectiveness of optical proximity corrections represented by the cell-level corrected pattern data generated. If the effectiveness of the corrections is negated, the method may further include the step of modifying the cell-level corrected pattern data or circuit patterns corresponding to the cell-level corrected pattern data to make the corrections effective and then re-evaluating effectiveness of the corrections. And if the effectiveness of the corrections is affirmed, the method may include the step of registering the cell-level corrected pattern data at a cell library.

A second inventive LSI mask data generating method includes the step of a) classifying multiple circuit patterns included in the LSI into first and second groups of corrected patterns. Each said corrected pattern of the first group will not be changed in shape even when process conditions are modified, while each said corrected pattern of the second group will be changed in shape if the process conditions are modified. The method further includes the steps of: b) setting specifications of cell-level optical proximity corrected patterns to be made for the first group of corrected patterns; c) designing the circuit patterns; and d) evaluating effectiveness of optical proximity corrections if the cell-level corrected patterns, which have been made for the first group of corrected patterns to the specifications of the cell-level corrected patterns, are used. If the effectiveness of the corrections is negated, the method further includes the step of e) modifying ineffective circuit patterns to make the corrections effective and re-evaluating effectiveness of the corrections. And if the effectiveness of the corrections is affirmed, the method further includes the steps of: f) registering the circuit patterns, belonging to the first and second groups of corrected patterns, at a cell library; g) generating chip-level pattern data from the circuit patterns that have been registered at the cell library; h) setting specifications of chip-level optical proximity corrected patterns to be made for the second group of corrected patterns; i) generating cell-level optical proximity corrected pattern data from the circuit patterns belonging to the first group of corrected patterns according to the specifications of the cell-level corrected patterns; and j) generating chip-level optical proximity corrected pattern data from the circuit patterns belonging to the second group of corrected patterns according to the specifications of the chip-level corrected patterns.

According to the second inventive LSI mask data generating method, specifications of cell-level corrected patterns are set for the circuit patterns belonging to the first group of corrected patterns, and those circuit patterns are registered at a cell library. Thereafter, when mask data is generated, cell- and chip-level corrected patterns with a huge data volume are made using the cell library. Accordingly, that huge volume of data can be managed more easily.

A third inventive LSI mask data generating method includes the step of a) classifying multiple circuit patterns included in the LSI into first and second groups of corrected patterns. Each said corrected pattern of the first group will not be changed in shape even when process conditions are modified, while each said corrected pattern of the second group will be changed in shape if the process conditions are modified. The method further includes the steps of: b) setting specifications of cell-level optical proximity corrected patterns to be made for the first group of corrected patterns; c) designing the circuit patterns; and d) evaluating effectiveness of optical proximity corrections if the cell-level corrected patterns, which have been made for the first group of corrected patterns to the specifications of the cell-level corrected patterns, are used. If the effectiveness of the corrections is negated, the method includes the step of e) modifying ineffective circuit patterns or the specifications of the cell-level corrected patterns corresponding to the circuit patterns to make the corrections effective and reevaluating effectiveness of the corrections. And if the effectiveness of the corrections is affirmed, the method further includes the steps of: f) registering not only the circuit patterns belonging to the first group of corrected patterns and the specifications of the cell-level corrected patterns corresponding to the circuit patterns, but also the circuit patterns belonging to the second group of corrected patterns at a cell library; g) generating chip-level pattern data from the circuit patterns that have been registered at the cell library; h) generating cell-level optical proximity corrected pattern data from the circuit patterns belonging to the first group of corrected patterns according to the specifications of the cell-level corrected patterns; and i) generating chip-level optical proximity corrected pattern data from the circuit patterns belonging to the second group of corrected patterns according to the specifications of the chip-level corrected patterns.

In one embodiment of the first through third inventive LSI mask data generating methods, if the corrections are effectively applicable to multiple layouts for circuit patterns, the step of evaluating preferably includes the step of selecting one of the layouts that results in a circuit area equal to or smaller than a predetermined value.

In this particular embodiment, the cell-level corrected pattern data preferably includes serif patterns, hammerhead patterns or in-section patterns.

A fourth inventive LSI mask data generating method includes the step of a) classifying multiple circuit patterns included in the LSI into first and second groups of corrected patterns. Each said corrected pattern of the first group is defined by circuit patterns placed to cover multiple layers, while each said corrected pattern of the second group is defined by circuit patterns placed within a single layer. The method further includes the steps of: b) generating interlayer optical proximity corrected pattern data from the first group of corrected patterns in designing the circuit patterns; and c) generating intralayer optical proximity corrected pattern data from the second group of corrected patterns in generating chip data from the circuit patterns.

According to the fourth inventive LSI mask data generating method, even if optical proximity corrections are made in advance on the first group of corrected patterns, those patterns of the first group can be registered at a library. Also, since the first group of corrected patterns greatly affects cell areas, the corrected patterns are determined at a cell level, i.e., while the cells are being designed. Accordingly, the areas of the cells to be produced finally based on the corrected patterns can be estimated accurately. Furthermore, since the optical proximity corrections can be made on a cell-by-cell basis, the specifications of optical proximity corrected patterns to be made can be determined for each cell or block.

In one embodiment of the present invention, the step b) may include the step of evaluating effectiveness of optical proximity corrections represented by the interlayer corrected pattern data generated. If the effectiveness of the corrections is negated, the method further includes the step of modifying the interlayer corrected pattern data or the circuit patterns corresponding to the corrected pattern data to make the corrections effective and re-evaluating effectiveness of the corrections. And if the effectiveness of the corrections is affirmed, the method further includes the step of registering the interlayer corrected pattern data at a cell library.

A fifth inventive LSI mask data generating method includes the step of a) classifying multiple circuit patterns included in the LSI into first and second groups of corrected patterns. Each said corrected pattern of the first group is defined by circuit patterns placed to cover multiple layers, while each said corrected pattern of the second group is defined by circuit patterns placed within a single layer. The method further includes the steps of: b) setting specifications of interlayer optical proximity corrected patterns to be made for the first group of corrected patterns; c) designing the circuit patterns; and d) evaluating effectiveness of optical proximity corrections if the interlayer corrected patterns, which have been made for the first group of corrected patterns to the specifications of the interlayer corrected patterns, are used. If the effectiveness of the corrections is negated, the method further includes the step of e) modifying ineffective circuit patterns to make the corrections effective and re-evaluating effectiveness of the corrections. And if the effectiveness of the corrections is affirmed, the method further includes the steps of: f) registering the circuit patterns, belonging to the first and second groups of corrected patterns, at a cell library; g) generating chip-level pattern data from the circuit patterns that have been registered at the cell library; h) setting specifications of intralayer optical proximity corrected patterns to be made for the second group of corrected patterns; i) generating interlayer optical proximity corrected pattern data from the circuit patterns belonging to the first group of corrected patterns according to the specifications of the interlayer corrected patterns; and j) generating intralayer optical proximity corrected pattern data from the circuit patterns belonging to the second group of corrected patterns according to the specifications of the intralayer corrected patterns.

According to the fifth inventive LSI mask data generating method, specifications of interlayer corrected patterns are set for the circuit patterns belonging to the first group of corrected patterns, and those circuit patterns are registered at a cell library. Thereafter, when mask data is generated, interlayer and intralayer corrected patterns with a huge data volume are made using the cell library. Accordingly, that huge volume of data can be managed more easily.

A sixth inventive LSI mask data generating method includes the step of a) classifying multiple circuit patterns included in the LSI into first and second groups of corrected patterns. Each said corrected pattern of the first group is defined by circuit patterns placed to cover multiple layers, while each said corrected pattern of the second group is defined by circuit patterns placed within a single layer. The method further includes the steps of: b) setting specifications of interlayer optical proximity corrected patterns to be made for the first group of corrected patterns; c) designing the circuit patterns; and d) evaluating effectiveness of optical proximity corrections if the interlayer corrected patterns, which have been made for the first group of corrected patterns to the specifications of the interlayer corrected patterns, are used. If the effectiveness of the corrections is negated, the method includes the step of e) modifying ineffective circuit patterns or the specifications of the interlayer corrected patterns corresponding to the circuit patterns to make the corrections effective and re-evaluating effectiveness of the corrections. And if the effectiveness of the corrections is affirmed, the method further includes the steps of: f) registering not only the circuit patterns belonging to the first group of corrected patterns and the specifications of the interlayer corrected patterns corresponding to the circuit patterns, but also the circuit patterns belonging to the second group of corrected patterns at a cell library; g) generating chip-level pattern data from the circuit patterns that have been registered at the cell library; h) generating interlayer optical proximity corrected pattern data from the circuit patterns belonging to the first group of corrected patterns according to the specifications of the interlayer corrected patterns; and i) generating intralayer optical proximity corrected pattern data from the circuit patterns belonging to the second group of corrected patterns according to the specifications of the intralayer corrected patterns.

In one embodiment of the fourth through sixth inventive LSI mask data generating methods, if the corrections are effectively applicable to multiple layouts for circuit patterns, the step of evaluating may include the step of selecting one of the layouts that results in a circuit area equal to or smaller than a predetermined value.

In this particular embodiment, the specifications of the interlayer corrected patterns to be made are preferably determined by a placement rule defining a layer including a gate of a transistor and another layer including an active region.

Alternatively, the specifications of the interlayer corrected patterns to be made may also be determined by a placement rule defining a first interconnection layer and another layer including a contact for electrically connecting the first interconnection layer to a second interconnection layer.

As another alternative, the step of evaluating may include the step of determining whether or not an expected actual size falls within a predetermined range by performing a process simulation including at least one of lithography and etching process steps.

In this case, the lithography process step in the process simulation may include determining whether or not the expected actual size falls within the predetermined range even if an exposure dose or focus has changed so much as to exceed a process margin range.

In this case, it may be determined in the process simulation whether or not an expected size of a transistor in a gate longitudinal direction falls within the predetermined range.

Alternatively, it may also be determined in the process simulation whether or not an expected length of a portion of a transistor gate extending from an active layer in a gate width direction falls within the predetermined range.

Second through seventh inventive methods for forming an LSI pattern each include the steps of: producing a mask in accordance with any of the first through sixth LSI mask data generating methods of the present invention; and defining the circuit patterns on a semiconductor substrate using the mask produced.

BRIEF DESCRIPTION OF THE DRAWINGS

FIG. 12(a) is a plan view illustrating chip-level circuit patterns belonging to a second category; and FIG. 12(b) is a plan view illustrating cell-level circuit patterns belonging to a first category.

FIG. 17(a) is a plan view illustrating interlayer circuit patterns belonging to a first category; and FIG. 17(b) is a plan view illustrating exemplary OPC patterns that have been made from the circuit patterns shown in FIG. 17(a).

DESCRIPTION OF THE PREFERRED EMBODIMENTS

Embodiment 1

Hereinafter, a first embodiment of the present invention will be described with reference to the accompanying drawings.

According to the first embodiment, a design rule is determined so as to satisfy the conditions that should be met to form OPC patterns of the type making optical proximity corrections effective when an LSI is fabricated. And circuit patterns are designed and mask pattern data is generated in accordance with the design rule determined.

Also, the OPC patterns are made from the circuit patterns in accordance with the design rule that makes the OPC effective, and basic process conditions are optimized based on the OPC patterns obtained. In this specification, the OPC can be regarded as "effective" when a pattern, which has been actually transferred onto a region with substantially the same area as an originally designed circuit pattern using this OPC pattern, ensures proper operation for a resulting circuit.

Figure 1:
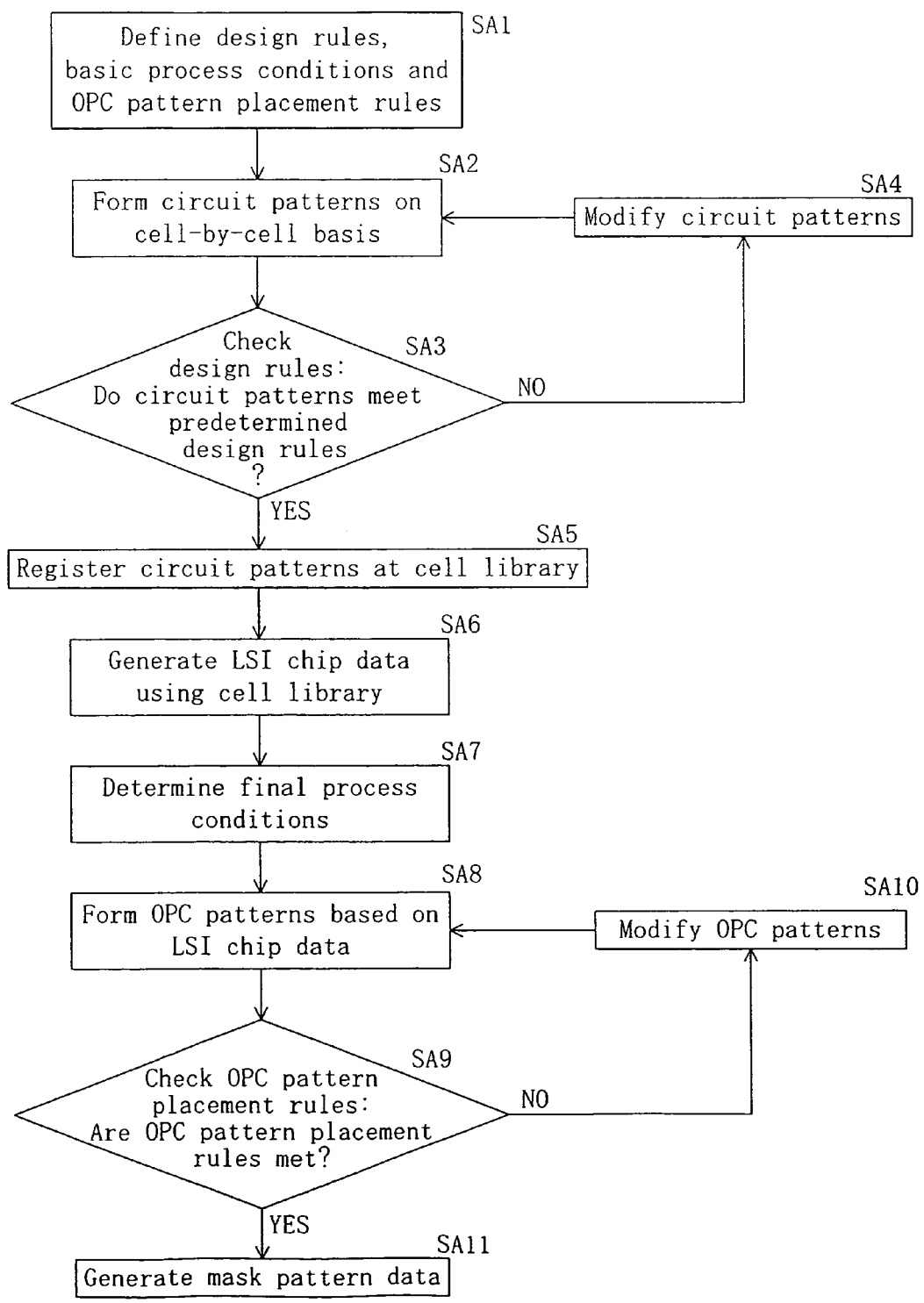
FIG. 1 is a flowchart illustrating an LSI mask data generating method according to a first embodiment of the present invention.

FIG. 1 illustrates a processing flow of an LSI mask data generating method according to the first embodiment. As shown in FIG. 1, first, in Step SA1, design rules that should be met to design patterns for circuits to be included in an LSI, basic process conditions, specifications of OPC patterns to be made from the circuit patterns and OPC pattern placement rules are defined. In this case, the "basic process conditions" include the wavelength, coherency, focal point and dose of exposing radiation and the numerical aperture of a lens as for a lithographic process. The basic process conditions further include selection of an exposure method, e.g., whether or not annular illumination technique should be adopted and whether or not a phase shifted mask should be used. The "design rules" are rules that should be met in the design of circuit patterns to obtain an actually operative circuit. The "OPC placement rules" are rules that should be met by OPC patterns such that the pattern actually transferred onto a wafer through exposure is processable. In other words, these rules are "design rules" imposed on the OPC patterns so to speak. And these rules include various details defining a basic pattern placement such as the minimum line width or space width of the OPC patterns. In this manner, design rules that will make originally designed patterns actually transferable are also applicable to OPC patterns to be mask patterns, while another design rules, which have been defined taking the OPC patterns to be formed into account, are applicable to circuit patterns. Thus, optimum conditions can be selected as the basic process conditions after the OPC patterns have been defined.

Next, in Step SA2, circuit patterns are formed on a cell-by-cell basis. In this case, the "cell" is a basic circuit component of an LSI.

Subsequently, in Step SA3, it is determined whether or not each of the circuit patterns that have been formed in Step SA2 meets the design rules. If the answer is NO, the method proceeds to Step SA4 of modifying part of the circuit pattern not meeting the design rules, and then Steps SA2 and SA3 are repeatedly performed. Alternatively, if the answer is YES, the method proceeds to Step SA5.

Then, in Step SA5, the circuit patterns that have been formed on a cell-by-cell basis are registered at a cell library, thereby storing basic cells needed to make an LSI chip pattern.

Thereafter, in Step SA6, circuit pattern data required for the LSI is extracted from the cell library and LSI chip data is generated using the circuit pattern data extracted.

Next, in Step SA7, final process conditions for the realization of the LSI chip data are determined. In this case, if the OPC placement rules should be changed in view of the final process conditions, then the OPC placement rules are changed. The reason is as follows. Generally speaking, in developing an LSI, it takes more than one year to establish a needed cell library after design rules were defined. In contrast, it takes at most several months to generate LSI chip data after the cell library was established. Accordingly, even if optimum process conditions had been determined to meet the design rules, the process conditions might be no longer optimum because of the introduction of new resist materials or apparatuses when LSI chip data should be generated using a cell library established. Thus, to further improve the productivity, the final process conditions should preferably be redefined when LSI chip data is generated.

Subsequently, in Step SA8, required OPC patterns are made based on the LSI chip data and according to the specifications of the OPC patterns to be made. Specifically, a deviation of an actual size from a mask size due to optical proximity effects is estimated under the final process conditions. And data is obtained about a mask layout that has been modified in such a manner as to eliminate the deviation of the actual size from the originally designed one.

Then, in Step SA9, it is determined whether or not each of the OPC patterns that have been made in Step SA8 meets the OPC pattern placement rules. If the answer is NO, the method proceeds to Step SA10 of correcting part of the OPC pattern that does not meet the OPC pattern placement rules, and then Steps SA8 and SA9 are repeatedly performed. Alternatively, if the answer is YES, the method proceeds to Step SA11 of generating mask pattern data using the OPC patterns.

Based on the mask pattern data obtained in this manner, a mask or reticle is produced and a pattern that will make a resulting circuit fully operative can be transferred onto a resist film on a semiconductor substrate, for example.

As described above, according to the prior art LSI development process, design rules are determined in an earlier process step and OPC patterns are formed in a later process step. Thus, if there is a circuit pattern or its placement, from which no OPC patterns can be made, it is virtually impossible to change the design rules. In contrast, according to the present invention, even after the design rules have been once defined, the design rules are modifiable in such a manner as to make the OPC patterns effectively applicable. Accordingly, circuit patterns or mask data that has been generated in accordance with the modified design rules can make the OPC effective with much more certainty.

Hereinafter, the details of the process step SA1 shown in FIG. 1 will be described with reference to FIG. 2.

Figure 2:
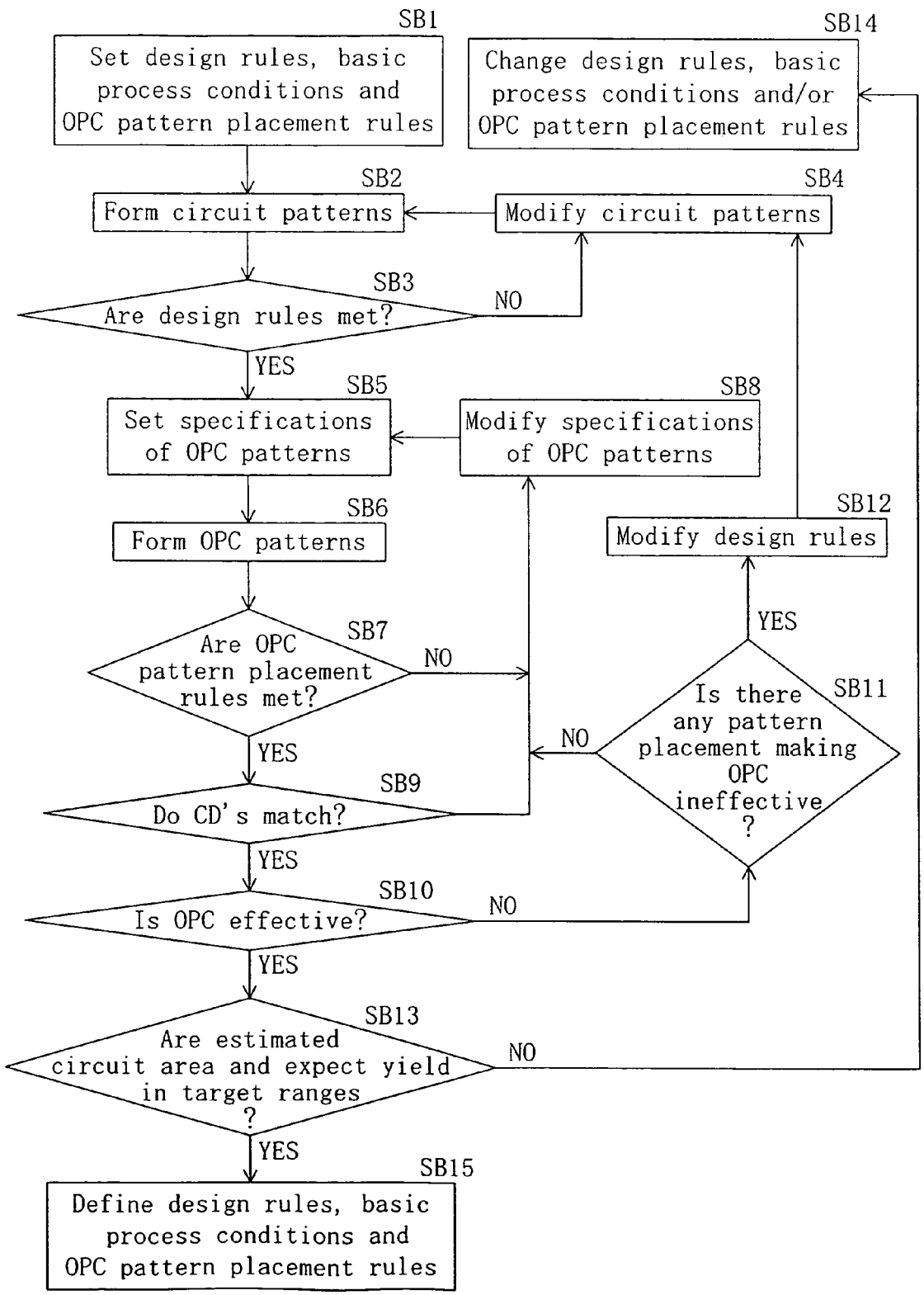
FIG. 2 is a flowchart illustrating an LSI pattern layout planning method according to the first embodiment.

FIG. 2 illustrates an LSI pattern layout planning method according to the first embodiment. Specifically, FIG. 2 illustrates an exemplary procedure of determining the basic process conditions and design rules, which are applied to the cell library. As shown in FIG. 2, first, in Step SB1, the design rules, basic process conditions and OPC pattern placement rules to be determined by the basic process conditions are initialized. These initial values are set to obtain several typical samples for the cell library to be established in Step SA6 shown in FIG. 1.

Next, in Step SB2, circuit patterns are formed in accordance with the design rules defined.

Subsequently, in Step SB3, it is determined whether or not each of the circuit patterns formed in Step SB2 meets the design rules. If the answer is NO, the method proceeds to Step SB4 of modifying part of the circuit pattern not meeting the design rules, and then Steps SB2 and SB3 are repeatedly performed.

Then, in Step SB5, specifications of OPC patterns to be made are set with respect to the circuit patterns. The OPC pattern specifications may be set by any known technique, i.e., no matter whether the technique is rules-based or models-based (i.e., simulation-based). That is to say, if the same circuit pattern should be made, then any technique is applicable so long as the same OPC pattern can be obtained by the technique. According to the "rules-based" technique, rules of making an OPC pattern are defined for each pattern category of the circuit pattern, and the OPC pattern is formed following the rules defined. On the other hand, according to the "models-based" technique, a mask pattern size is calculated by a model equation, which is used to simulate an actual pattern size, such that the actual pattern size matches an originally designed one in a circuit pattern.

Thereafter, in Step SB6, OPC patterns are formed for respective circuit patterns to the OPC pattern specifications that have been set in Step SB5.

Hereinafter, specific examples of the circuit and OPC patterns will be described with reference to the accompanying drawings.

Figure 3:
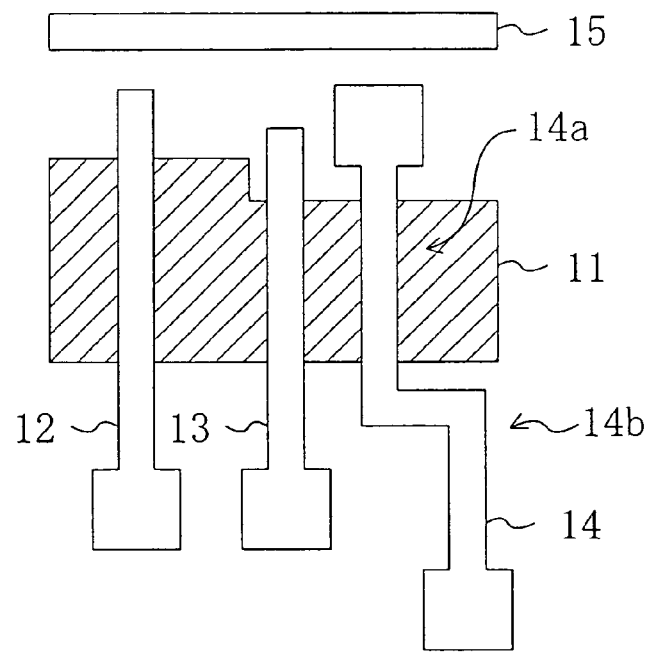
FIG. 3 is a plan view illustrating exemplary circuit patterns used in the LSI pattern layout planning method according to the first embodiment.

FIG. 3 illustrates exemplary circuit patterns. As shown in FIG. 3, the circuit patterns representing a transistor circuit includes a rectangle active layer pattern 11, which has a notched longer side. Over the active layer pattern 11, first, second and third gate patterns 12, 13 and 14 are placed. The first gate pattern 12 crosses the two longer sides of the active layer pattern 11 and overlaps with non-notched part of the active layer pattern 11. The second and third gate patterns 13 and 14 are both parallel to the first gate pattern 12 and both overlap with the notched part of the active layer pattern 11. In addition, a line pattern 15 is also placed to be spaced apart from, and parallel to, the notched longer side of the active layer pattern 11.

The third gate pattern 14 includes a transistor portion 14*a* functioning as gate electrode of the transistor and a gate line portion 14*b* with a folded part, which extends over a peripheral region (i.e., isolation region) of the active layer pattern 11.

Figure 4:
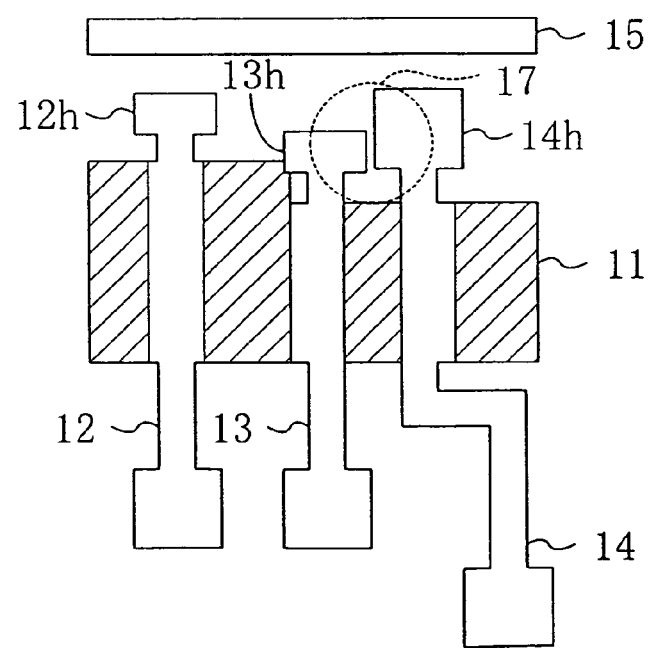
FIG. 4 is a plan view illustrating exemplary OPC pattern that have been made from the circuit patterns shown in FIG. 3 in the LSI pattern layout planning method according to the first embodiment.

FIG. 4 illustrates exemplary OPC patterns that have been made from the circuit patterns shown in FIG. 3. In the illustrated example, the OPC pattern specifications are set in the following manner. First, hammerhead patterns 12*h*, 13*h* and 14*h* are provided for the respective edges of the first, second and third gate patterns 12, 13 and 14 that are closer to the first line pattern 15. Also, the widths (i.e., gate lengths) of respective parts of the gate patterns 12, 13 and 14 that are located over the active layer pattern 11 are changed in accordance with the distance between an adjacent pair of gate patterns.

Figure 5:
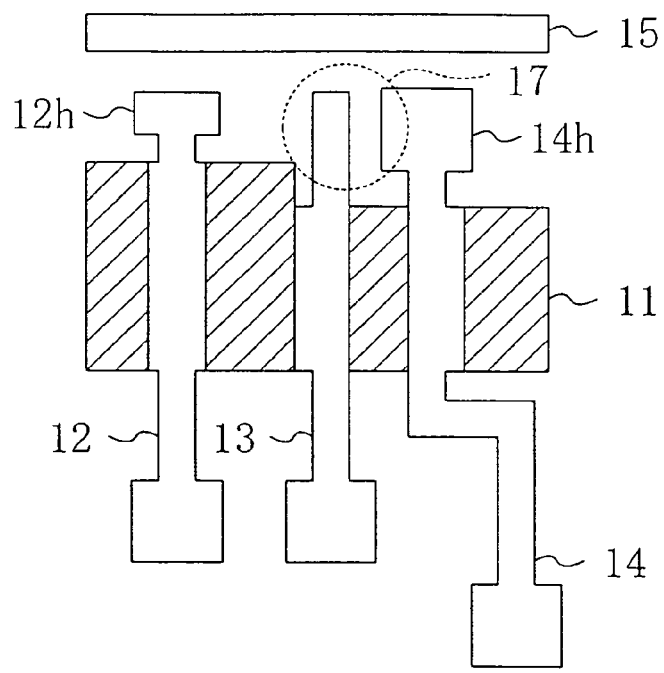
FIG. 5 is a plan view illustrating another exemplary OPC patterns that have also been made from the circuit patterns shown in FIG. 3 in the LSI pattern layout planning method according to the first embodiment.

Next, in Step SB7, it is determined whether or not each of the OPC patterns that have been made in Step SB6 shown in FIG. 2 meets the OPC pattern placement rules set in Step SB1. For instance, in the example illustrated in FIG. 4, the width of the space between the patterns 13*h* and 14*h* in a region 17 to be checked is smaller than the minimum permissible space width as defined by the OPC pattern placement rules. If the OPC pattern placement rules are not met in this manner, then the method proceeds to Step SB8 shown in FIG. 2. In Step SB8, the OPC pattern specifications are modified such that the OPC pattern placement rules are also met in the region 17. And then Steps SB5, SB6 and SB7 are repeatedly performed. To eliminate the violation of the rule in the region 17 shown in FIG. 4, the specifications should be modified by changing the shapes of the respective OPC patterns 12 through 14 depending on the distance between adjacent patterns, e.g., the hammerhead patterns 12*h*, 13*h* and 14*h*. FIG. 5 illustrates OPC patterns that have been re-shaped according to the modified OPC pattern specifications. As encircled in the region 17 shown in FIG. 5, the hammerhead pattern 13*h* is erased from the edge of the second gate pattern 13 closer to the line pattern 15 and that edge of the second gate pattern 13 is extended and aligned with those of the hammerhead patterns 12*h* and 14*h* of the first and third gate patterns 12 and 14.

After it has been confirmed that all the OPC pattern placement rules are satisfied, it is determined whether or not the dimensions of an actual pattern that will be made from the OPC pattern, i.e., critical dimensions (CD), will match those of the originally designed circuit pattern in Step SB9 shown in FIG. 2. In other words, Step SB9 is a process step of seeing if an effective OPC pattern has been formed. In this case, it is usually difficult to determine, using a real circuit, whether or not the dimensions of the actually transferred pattern match those of the originally designed circuit pattern. Thus, some simulation technique that can reproduce the real circuit precisely should be used. It should be noted, however, that it is not necessary to check the CD for every part of a single circuit. In actuality, the CD's has to be checked in only a portion of a circuit, where the actual size should exactly match the designed size, e.g., the gate length of a gate pattern. If it has been determined that the CD's are not equal to each other, then the method proceeds to Step SB8, in which the OPC pattern specifications are further modified to eliminate the portions in question from the OPC pattern. Then, Steps SB5, SB6, SB7 and SB9 are repeatedly performed.

Next, in Step SB10, it is determined whether or not the OPC pattern with its CD's checked is effective. In this case, it is not whether the size of the actual pattern exactly matches that of the originally designed pattern that should be determined. Instead it has to be determined whether the actual pattern size meets the conditions that should be satisfied to make the circuit operate properly. In Step SB10, some simulation technique that can reproduce a real circuit precisely is also used as in Step SB9. For example, the actual size of a gate extension of a circuit pattern is checked. Specifically, it is not whether the actual size of an edge of a gate pattern matches that of the originally designed circuit pattern that should be determined here. Instead, it may be determined whether or not an active layer pattern is exposed in a region where the active layer pattern overlaps with the gate pattern in the actually transferred pattern as a result of the disappearance of the extension of the gate pattern. Also, even if the size of the extension of the actually formed gate pattern is longer than a predetermined size, there is no problem unless the operation of the circuit is interfered with a shortcircuit caused between the elongated extension and another pattern. However, the effectiveness of the OPC cannot be checked too carefully because the circuit is inoperative anymore should any convenience be caused. Thus, in checking the effectiveness, not only the predetermined process conditions, but also process conditions with margins should be taken into account because the process conditions are variable during real-world fabrication process.

Figure 6:
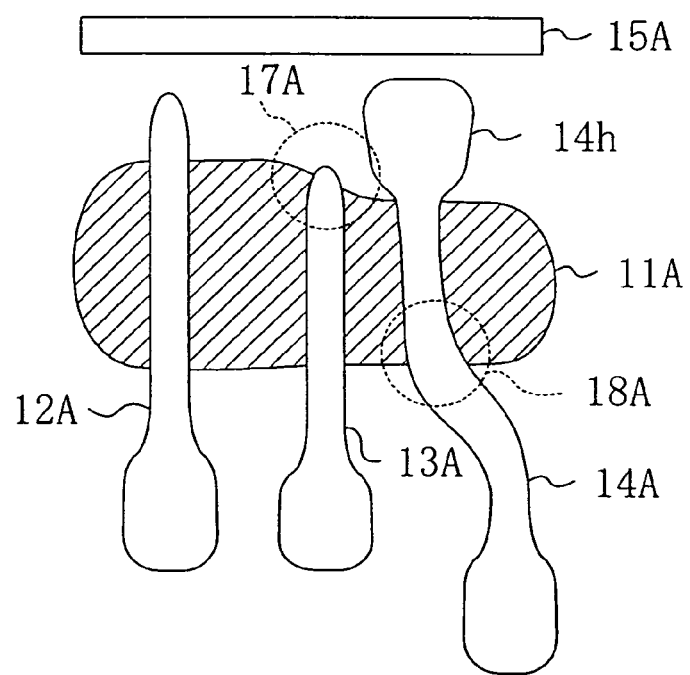
FIG. 6 is a plan view illustrating exemplary actually transferred patterns that have been made from the OPC patterns shown in FIG. 5 in the LSI pattern layout planning method according to the first embodiment.

FIG. 6 illustrates exemplary simulated patterns that would be actually formed and are analyzed in Step SB10 of checking the effectiveness of the OPC. As shown in FIG. 6, all of the corners and notch of the active layer pattern 11A have been rounded and the extension of the second gate pattern 13 closer to the line pattern 15 has almost disappeared. As can be seen from this simulation result, the gate width of the second gate pattern 13A has shortened in a first region 17A to be checked and the source/drain regions of the active layer pattern 11A of the transistor are virtually short-circuited, thus preventing the circuit from operating normally. In addition, in a second region 18A to be checked, the folded portion of the third gate pattern 14A has also been rounded and the gate length has locally increased near a side of the active layer pattern 11A, thus also interfering with the proper operation. In the example shown in FIG. 6, however, no margin has been added to the process conditions. In practice, though, an actually formed pattern is simulated after predetermined margin has been added to the process conditions.

If the effectiveness of the OPC is negated as shown in FIG. 6 (i.e., if it has been determined that the circuit would not operate properly), then the method proceeds to Step SB11 shown in FIG. 2. In Step SB11, it is determined whether or not there is any pattern placement that makes the OPC ineffective in the circuit patterns.

If the answer to the query in Step SB11 is NO, then Steps SB8, SB5, SB6, SB7, SB9 and SB10 are repeatedly performed to modify the OPC pattern specifications such that the OPC becomes effective. Alternatively, if the answer to the query in Step SB11 is YES, then the method proceeds to Step SB12, in which the design rules are modified to eliminate the pattern placement that makes the OPC ineffective. Then, respective steps from SB4 on are repeatedly performed.

Figure 7:
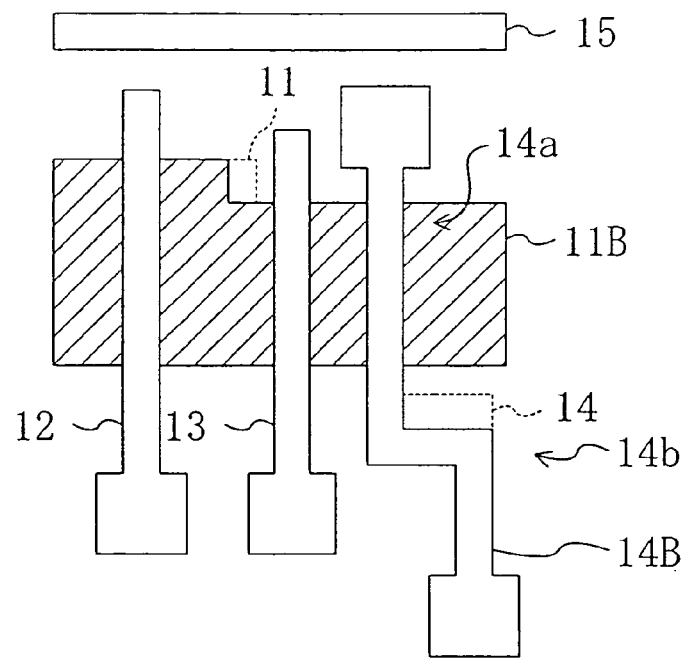
FIG. 7 is a plan view illustrating modified versions of the circuit patterns shown in FIG. 3 in the LSI pattern layout planning method according to the first embodiment.

FIG. 7 illustrates a result of Step SB4 of modifying the pattern placement that makes the OPC ineffective. In the illustrated example, the design rules are modified such that a predetermined space is provided between the gate and active layer patterns. Accordingly, a space between a longer side of the active layer pattern 11B and a part of the gate line portion 14b of the third gate pattern 14B that is parallel to the longer side of the active layer pattern 11B is increased compared to its initial value. In the same way, the space between a side of the second gate pattern 13 and an edge of the notch of the active layer pattern 11B between the first and second gate patterns 12 and 13 is also larger than its initial value. In FIG. 7, the original outlines of the third gate pattern 14 and the active layer pattern 11 before the modification are represented by broken lines.

Figure 8:
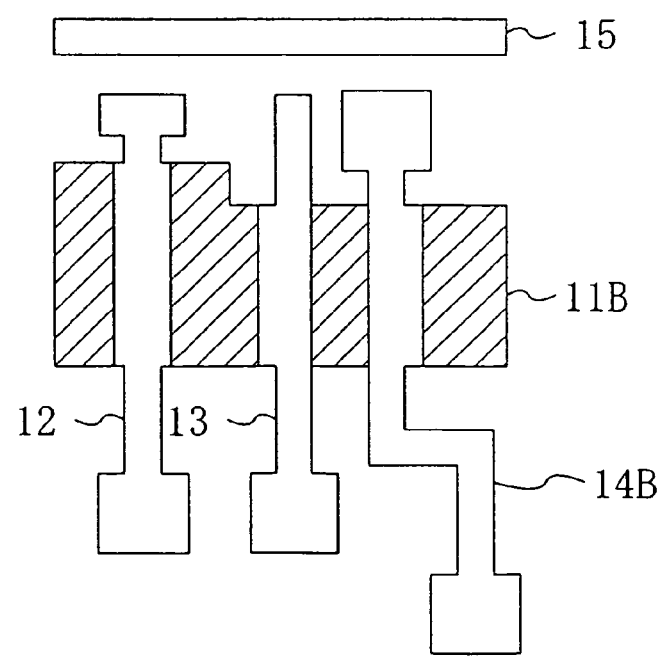
FIG. 8 is a plan view illustrating exemplary OPC patterns that have been made from the circuit patterns shown in FIG. 7 in the LSI pattern layout planning method according to the first embodiment.
Figure 9:
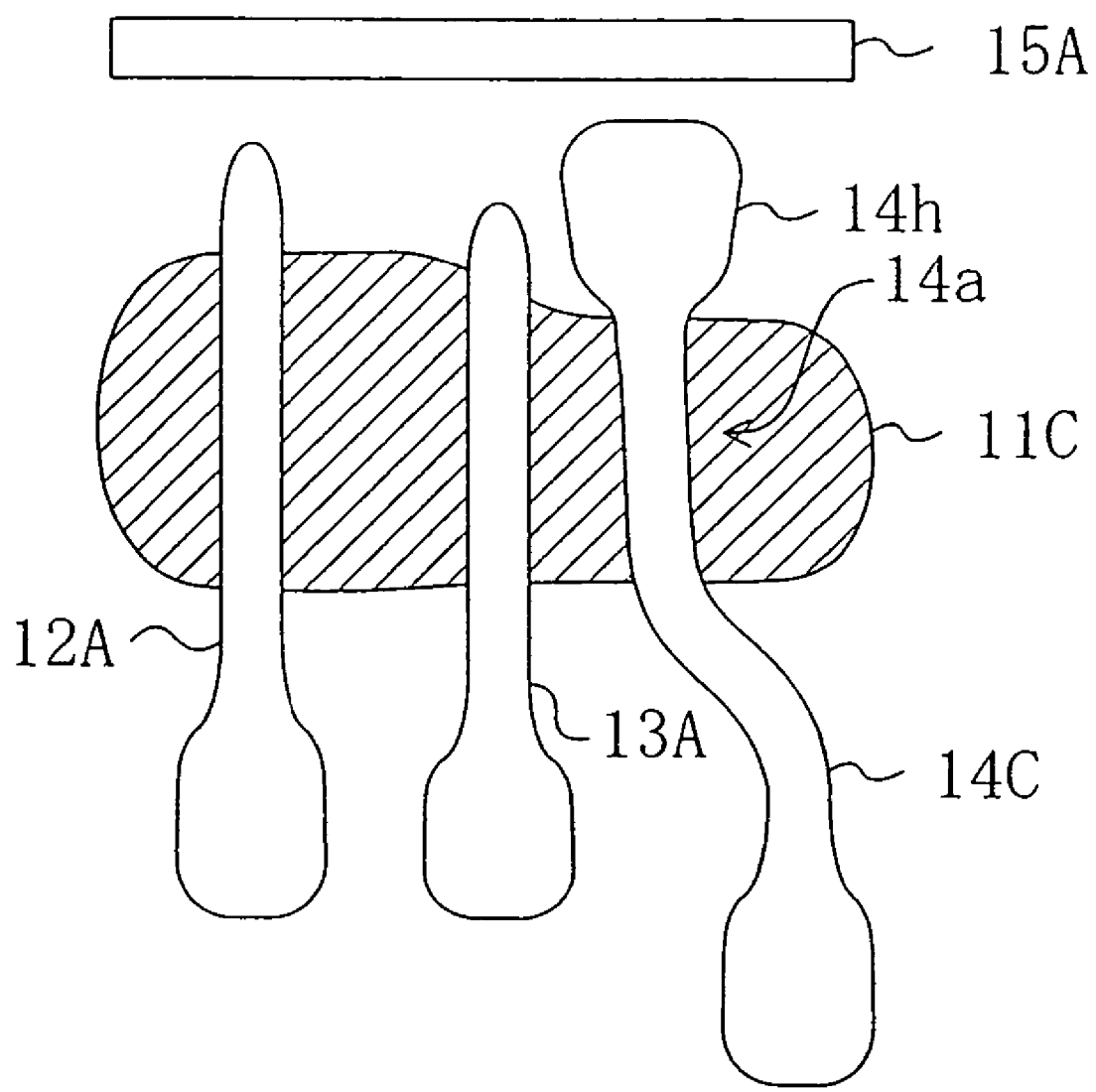
FIG. 9 is a plan view illustrating exemplary actually transferred patterns that have been made from the OPC patterns shown in FIG. 8 in the LSI pattern layout planning method according to the first embodiment.

FIG. 8 illustrates exemplary OPC patterns that have been made from the circuit patterns shown in FIG. 7. FIG. 9 illustrates simulated patterns that would be made actually from the OPC patterns shown in FIG. 8. As shown in FIG. 9, the extension of the second gate pattern 13A at its edge closer to the line pattern 15A is long enough to ensure a predetermined gate length. Also, the gate length of the transistor portion 14a of the third gate pattern 14C is substantially constant. As can be seen, by changing the design rules in such a manner as to make the OPC effective, circuit patterns ensuring effective OPC can be obtained without repeating several process steps all over again.

Then, in Step SB13 shown in FIG. 2, a total circuit area (i.e., cell area) of the circuit patterns ensuring the OPC effects is estimated. In addition, an expected yield of circuits that can be formed based on the actual patterns corresponding to the OPC versions of the circuit patterns and that would operate normally is also estimated. The expected yield may be estimated by a technique of expecting the percentage of transistors operating normally in a cell as disclosed in Japanese Laid-Open Publication No. 10-284608 or No. 11-121345. This is because the percentage of normally operating transistors can be regarded as the expected yield of the circuit patterns. More specifically, an actual size ensuring normal operation of transistors is represented as a response surface function using the process conditions or the size of a mask pattern for a transistor as variables. Furthermore, a distribution of expected variation in process conditions during a fabrication process is substituted into the response surface function, thereby calculating the probability of normal operation of transistors when the actual size is adopted in the fabrication process. In general, the smaller the total area of circuit patterns, the lower the expected yield of circuits operating normally.

If it has been determined in Step SB13 that the total area of the circuit patterns is larger than the originally designed one, then the method proceeds to Step SB14, in which the design rules and corresponding OPC pattern placement rules are modified to obtain smaller circuit patterns. Then, respective steps from Step SB1 on are performed all over again. In the same way, if it has been determined in Step SB13 that the expected yield of normally operating circuits is lower than its target value, then the method also advances to Step SB14, in which the basic process conditions are improved and the design rules and associated OPC pattern placement rules are changed to obtain larger circuit patterns. Then, respective steps from Step SB1 on are performed all over again.

On the other hand, if both the total area of the circuit patterns and the expected yield meet are within their target ranges, then the method proceeds to Step SB15. In this process step SB15, the design rules, basic process conditions, OPC pattern placement rules, OPC pattern specifications and circuit pattern data are all determined finally.

As described above, according to this embodiment, multiple circuits (or cells) are prepared as typical samples to be registered at a cell library, thereby realizing a target circuit area of the cell library of the current generation. In addition, the basic process conditions and design rules can be determined for the resulting circuit so as to attain the expected value of normal operation. Naturally, the larger the number of samples, the better the design rules, OPC pattern placement rules and OPC pattern specifications can be.

In summary, the effects attainable by this embodiment are as follows:

(a) Design rules are determined to meet the conditions that should be satisfied to make the OPC effective. And circuit patterns are designed in accordance with the design rule determined. Thus, required OPC patterns can always be obtained before the final process step of generating mask pattern data.

(b) Design rules are finally determined such that the conditions that should be met to make the OPC effective are also reflected on design rules defined to design circuit patterns belonging to several typical categories. Thus, the design rules obtained are applicable very broadly.

(c) In determining the design rules, a predetermined cell area is adopted as one of the conditions that make the OPC effective. Thus, if the predetermined cell area is set to half as large as that of the circuits included in an LSI of the previous generation, then the design rules cannot be larger than required.

(d) Design rules are decreased based on the shrinkage rate of a total circuit area, not based on that of the size of an actual pattern that is made from each circuit pattern defined by the design rules. Thus, a pattern designed is not unnecessarily hard to realize.

(e) The basic process conditions are re-defined in view of OPC patterns to be made and to improve the productivity as in Step SB14. Thus, the basic process conditions are not defined inappropriately compared to final process conditions.

Embodiment 2

Hereinafter, a second embodiment of the present invention will be described with reference to the accompanying drawings. According to the second embodiment, design rules are determined so as to satisfy the conditions that should be met to form required OPC patterns as in the first embodiment.

And circuit patterns are designed and mask pattern data is generated in accordance with the design rules determined. In particular, according to the second embodiment, each cell (basic circuit) being designed can be individually checked for the effectiveness of the OPC. Thus, a cell area can be reduced on a cell-by-cell basis.

Figure 10:
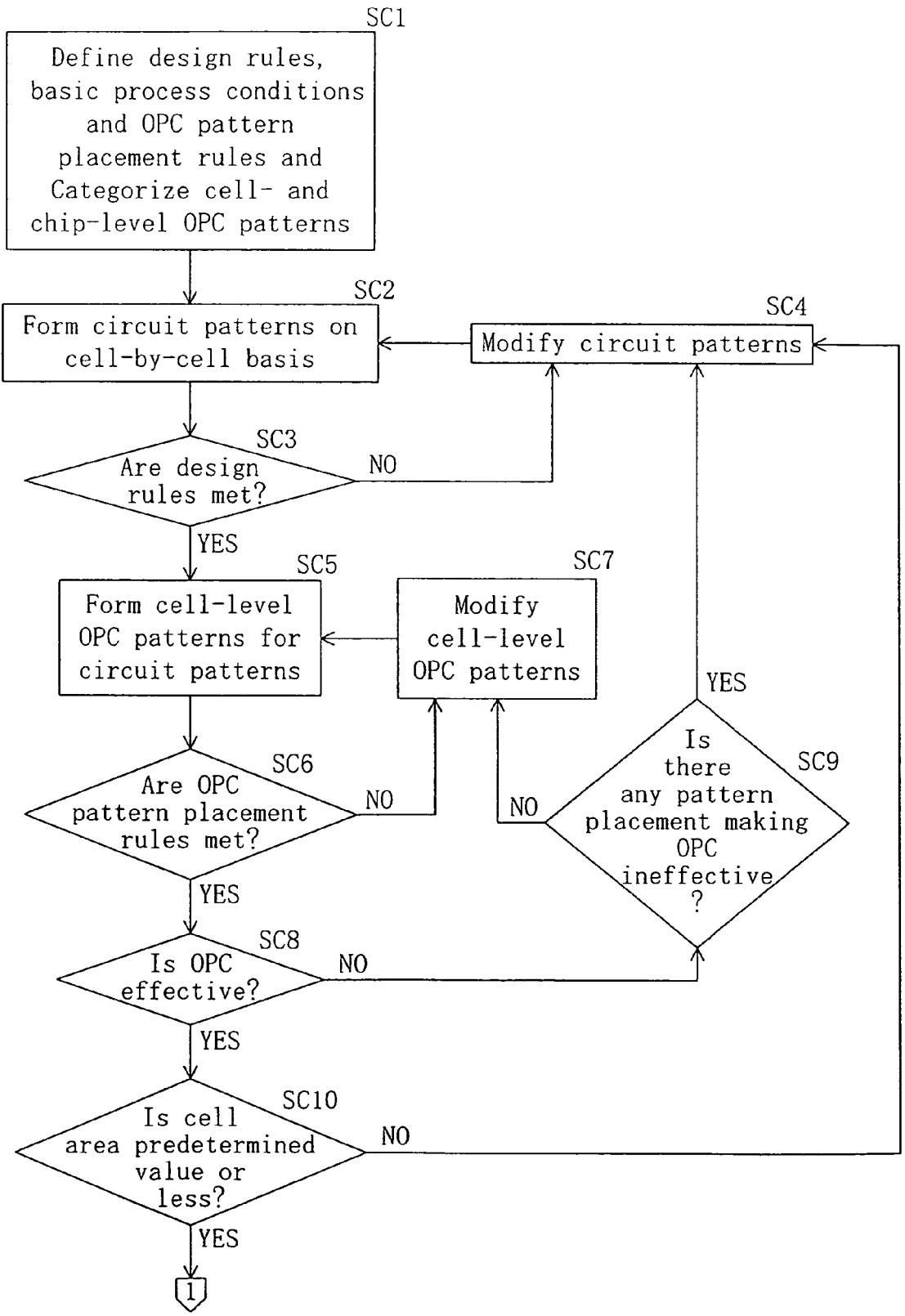
FIGS. 10 and 11 illustrate a flowchart of an LSI mask data generating method according to a second embodiment of the present invention.
Figure 11:
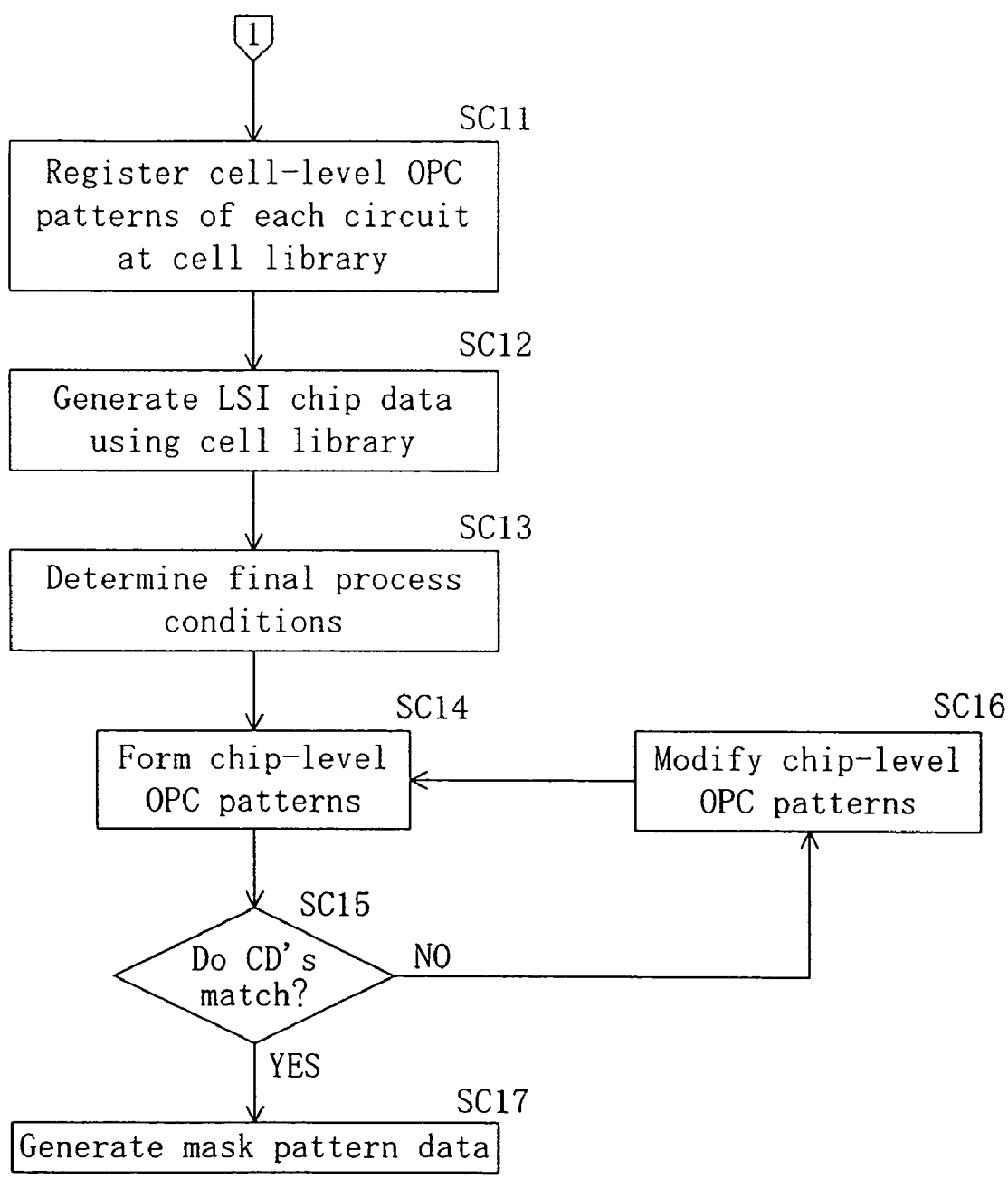

FIGS. 10 and 11 illustrate a processing flow of an LSI mask data generating method according to the second embodiment.

First, in Step SC1 shown in FIG. 10, design rules, basic process conditions and OPC pattern placement rules are determined. In this case, the design rules and the basic process conditions are determined as in Step SA1 shown in FIG. 1. On the other hand, the OPC pattern placement rules are defined by classifying OPC patterns into first and second categories. Each OPC pattern in the first category does not have to be modified so sensitively to any variations in process conditions. In contrast, each OPC pattern in the second category does have to be modified sensitively to the variations in process conditions.

Figure 12A:
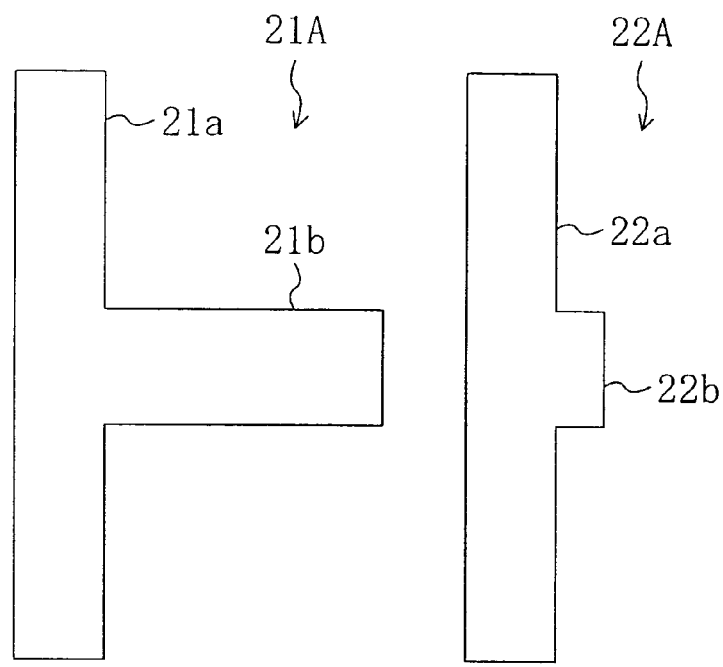
FIGS. 12(a) and 12(b) illustrate patterns used to exemplify categories adopted in the LSI mask data generating method according to a second embodiment.
Figure 12B:
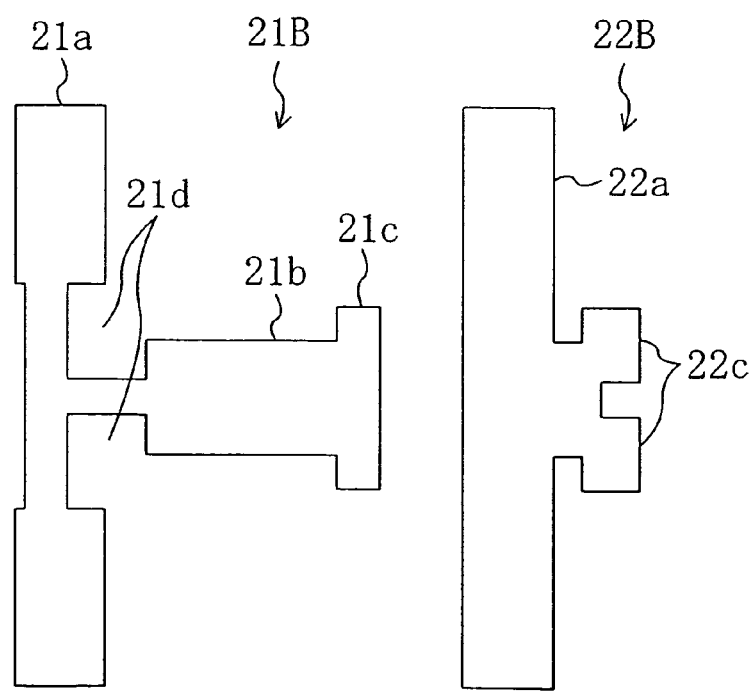

Hereinafter, specific examples of the first and second categories will be described with reference to FIGS. 12(*a*) and 12(*b*). As shown in FIG. 12(*a*), first and second patterns 21A and 22A are placed and spaced apart from each other. Each of the first and second patterns 21A and 22A includes a line portion 21*a*, 22*a* and an extension 21*b*, 22*b* that extends from one side of the line portion 21*a*, 22*a*. The end of the extension 21*b* of the first pattern 21A reaches farther than that of the extension 22*b* of the second pattern 22A. Also, these line portions 21*a* and 22*a* are placed in parallel to each other. In this case, if an OPC pattern should be formed with the actual line width of the line portion 21*a* or 22*a* changed, then the OPC pattern should be sensitive to any variations in process conditions and is classified in the second category. Although not shown, the actual gate length of a gate pattern has to exactly match its originally designed size and is also classified in the second category.

On the other hand, a first OPC pattern 21B is formed based on the first pattern 21A as shown in FIG. 12(*b*). The first OPC pattern 21B includes: a hammerhead pattern 21*c* provided at the end of the extension 21*b*; and an in-section pattern 21*d* formed by thinning the connection between the line and extensions 21*a* and 21*b*. The hammerhead pattern 21*c* and the in-section pattern 21*d* do not have to be modified sensitively to variations in process conditions, and are classified as the first category. Similarly, serif patterns 22*c* provided at both corner edges of the extension 22*b* of a second OPC pattern 22B, which has been formed based on the second pattern 22A, are also classified as the first category. In the illustrated example, the hammerhead and serif patterns 21*c* and 22*c* are provided to prevent the edges of the original patterns from disappearing, while the in-section pattern 21*d* is provided to prevent the connection between the line and extensions 21*a* and 21*b* from rounding.

Generally speaking, an OPC pattern of the type playing a key role in determining the total area of circuit patterns (i.e., a cell area), or an OPC pattern attaining remarkable OPC effects for a miniaturized cell area, belongs to the first category. In the following description, such an OPC pattern in the first category will be called a "cell-level OPC pattern", because optical proximity corrections can be performed using such a pattern even at the stage of designing a cell library before process conditions are finally determined. In contrast, an OPC pattern in the second category cannot be formed until process conditions are finally determined. That is to say, optical proximity corrections can be performed using such a pattern only after LSI chip data has been generated and final process conditions have been defined. Thus, a pattern of the latter type will be called a "chip-level OPC pattern".

Next, in Step SC2 shown in FIG. 10, circuit patterns are formed on a cell-by-cell basis in accordance with the design rules defined in Step SC1 irrespective of the categories of the patterns.

Subsequently, in Step SC3, it is determined whether or not each of the circuit patterns formed meets the design rules. If the answer is NO, the method proceeds to Step SC4 of modifying part of the circuit pattern not meeting the design rules, and then Steps SC2 and SC3 are repeatedly performed. Alternatively, if the answer is YES, the method proceeds to Step SC5.

Then, in Step SC5, cell-level OPC patterns are made from some of the circuit patterns that belong to the first category. Each cell-level OPC pattern is preferably formed by a rules-based technique. Specifically, rules that should be followed in making a cell-level OPC pattern from each of the circuit patterns are defined, and then the cell-level OPC pattern is made in accordance with the rules defined. In this case, it is to make OPC fully effective that an OPC pattern is made. Accordingly, an OPC pattern does not have to be made such that an estimated size of an actual pattern exactly matches the size of an originally designed circuit pattern. Instead, the OPC pattern should be optimized to obtain a simulated actual pattern allowing the circuit pattern to operate normally within its limited area. That is to say, any OPC pattern may be formed so long as the OPC pattern would contribute to increasing an expected yield of normally operating circuits. More specifically, the estimated actual size of a portion that does not interfere with the normal operation of the circuit may greatly deviate from that of a corresponding portion of the circuit pattern. Accordingly, a rules-based technique, by which rules that should be followed in making an OPC pattern can be defined for each feature of a circuit pattern, is suitably applicable as a model of forming the OPC pattern. This is because estimated actual sizes determined for a circuit pattern are effectuated as they are according to the models-based technique.

Then, in Step SC6, it is determined whether or not each of the cell-level OPC patterns that have been made in Step SC5 meets the OPC pattern placement rules. If the answer is NO, the method proceeds to Step SC7 of modifying part of the cell-level OPC pattern that does not meet the OPC pattern placement rules, and then Steps SC5 and SC6 are repeatedly performed.

Next, in Step SC8, it is determined whether or not OPC attainable by each of the cell-level OPC patterns meeting the OPC pattern placement rules is effective. The effectiveness of the OPC may be evaluated by some simulation technique that can reproduce a real circuit precisely as in Step SB10 according to the first embodiment. Specifically, it is not whether the estimated actual size of a gate pattern edge matches that of the originally designed circuit pattern that should be determined. Rather, it should be determined whether or not an active layer pattern is exposed in a region where the active layer pattern overlaps with the gate pattern in the actually transferred pattern as a result of the disappearance of the extension of the gate pattern. However, the effectiveness of the OPC cannot be checked too carefully because the circuit is inoperative anymore should any convenience be caused. Thus, in checking the effectiveness, not only the predetermined process conditions, but also process conditions with margins should be taken into account because the process conditions are variable during real-world fabrication process.

If the effectiveness of the OPC is negated in Step SC8 (i.e., if it has been determined that the circuit would not operate properly), then the method proceeds to Step SC9. In Step SC9, it is determined whether or not there is any pattern placement that makes the OPC ineffective in the circuit pattern.

If the answer to the query in Step SC9 is NO, then Steps SC7, SC5, SC6 and SC8 are repeatedly performed to remake the cell-level OPC pattern such that the OPC becomes effective. Alternatively, if the answer to the query in Step SC9 is YES, then the method proceeds to Step SC4, in which the circuit patterns are modified to eliminate the pattern placement that makes the OPC ineffective. Then, respective steps from SC2 on are repeatedly performed.

Then, in Step SC10, it is determined whether or not the cell area, or the total area of circuit patterns, is smaller than its target value. If the cell area is found larger than the target value, then the method proceeds to Step SC4, in which the circuit patterns are modified to reduce the cell area. Alternatively, if the cell area is found equal to or smaller than the target value, then the method proceeds to Step SC11 shown in FIG. 11.

Thereafter, in Step SC11 shown in FIG. 11, the cell-level OPC patterns, which have been prepared on the cell-by-cell basis, are registered at a cell library for use to make mask patterns for respective circuit patterns. The circuit patterns belonging to the second category are registered at the cell library as they are. As a result, data about basic circuit components, of which an LSI chip pattern will be made, can be collected.

Next, in Step SC12, data about the circuit patterns needed to fabricate an LSI is extracted from the cell library and LSI chip data is generated using the circuit pattern data extracted.

Subsequently, in Step SC13, final process conditions for the realization of the LSI chip data are determined.

Then, in Step SC14, it is estimated more accurately in accordance with the final process conditions how much an actual size would deviate from a mask size due to proximity effects. Based on the results of this estimation, a chip-level OPC pattern is made for portion of a cell belonging to the second category, e.g., portion in which the actual gate length of a gate pattern should exactly match a designed one. In this case, the OPC pattern can be made by either the rules-based or models-based technique.

Next, in Step SC15, it is determined whether or not the dimensions of an actual pattern that will be made from the chip-level OPC pattern, i.e., critical dimensions (CD), match those of the originally designed circuit pattern. In this case, the CD's are also checked by some simulation technique that can reproduce a real circuit precisely. It should be noted, however, that it is not necessary to check the CD for each and every part of a single circuit pattern. In actuality, the CD's have to be checked in only a portion of a circuit pattern, where the actual sizes should exactly match the designed sizes. If it has been determined that the CD's are not equal to each other, then the method proceeds to Step SC16, in which the chip-level OPC pattern is further modified to eliminate the portions in question from the OPC pattern. Then, Steps SC14 and SC15 are repeatedly performed. It should be noted that if the models-based technique is applied in Step SC14, then the CD's do not have to be checked.

Finally, in Step SC17, mask pattern data is generated using the cell- and chip-level OPC patterns. Based on the mask pattern data obtained in this manner, a mask or reticle is produced and a pattern that will make a resulting circuit fully operative can be transferred onto a resist film on a semiconductor substrate, for example, by using the mask or reticle.

Modified Example of Embodiment 2

Hereinafter, a modified example of the second embodiment will be described with reference to the accompanying drawings.

Figure 13:
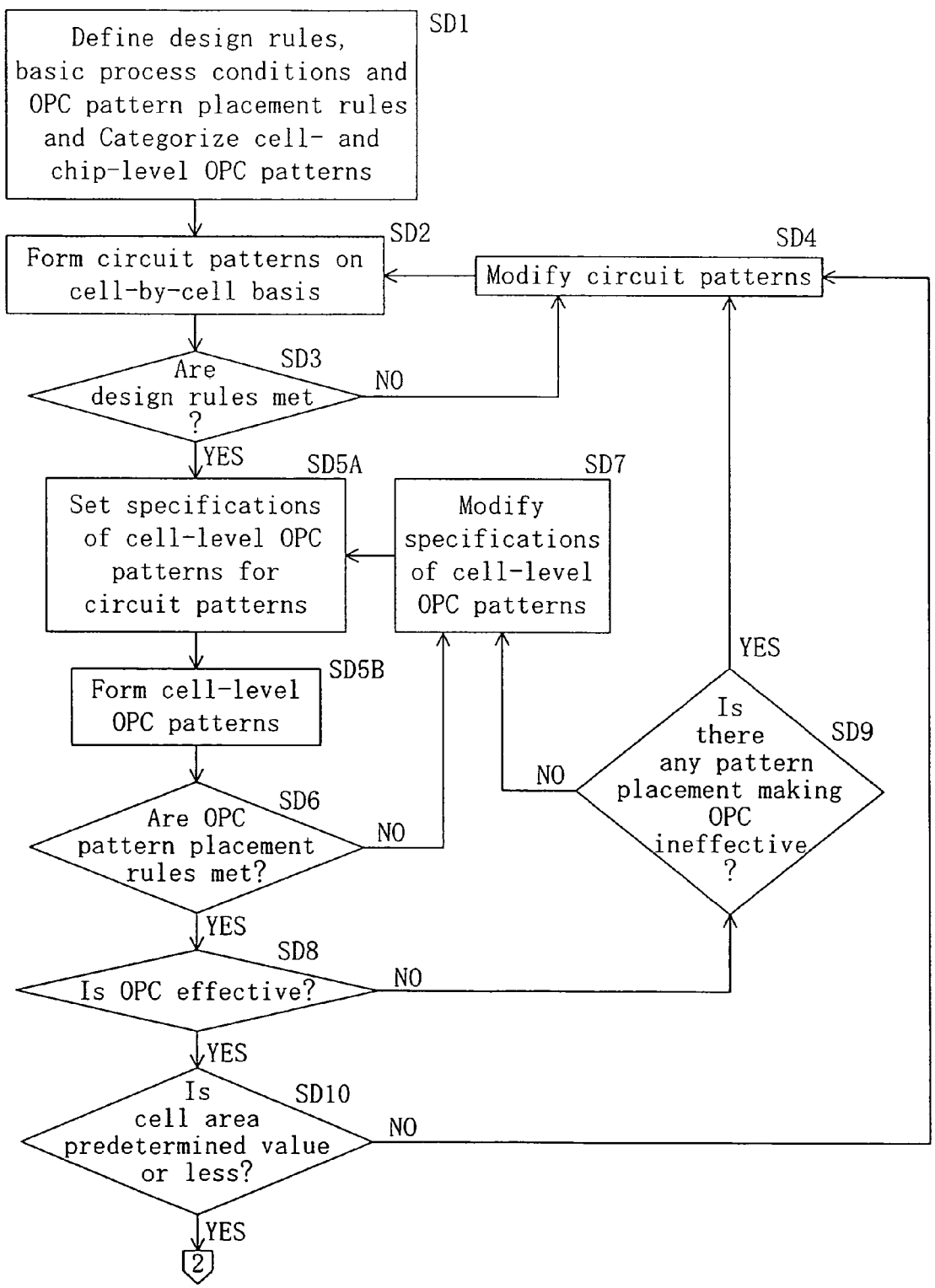
FIGS. 13 and 14 illustrate a flowchart of an LSI mask data generating method according to a modified example of the second embodiment.
Figure 14:
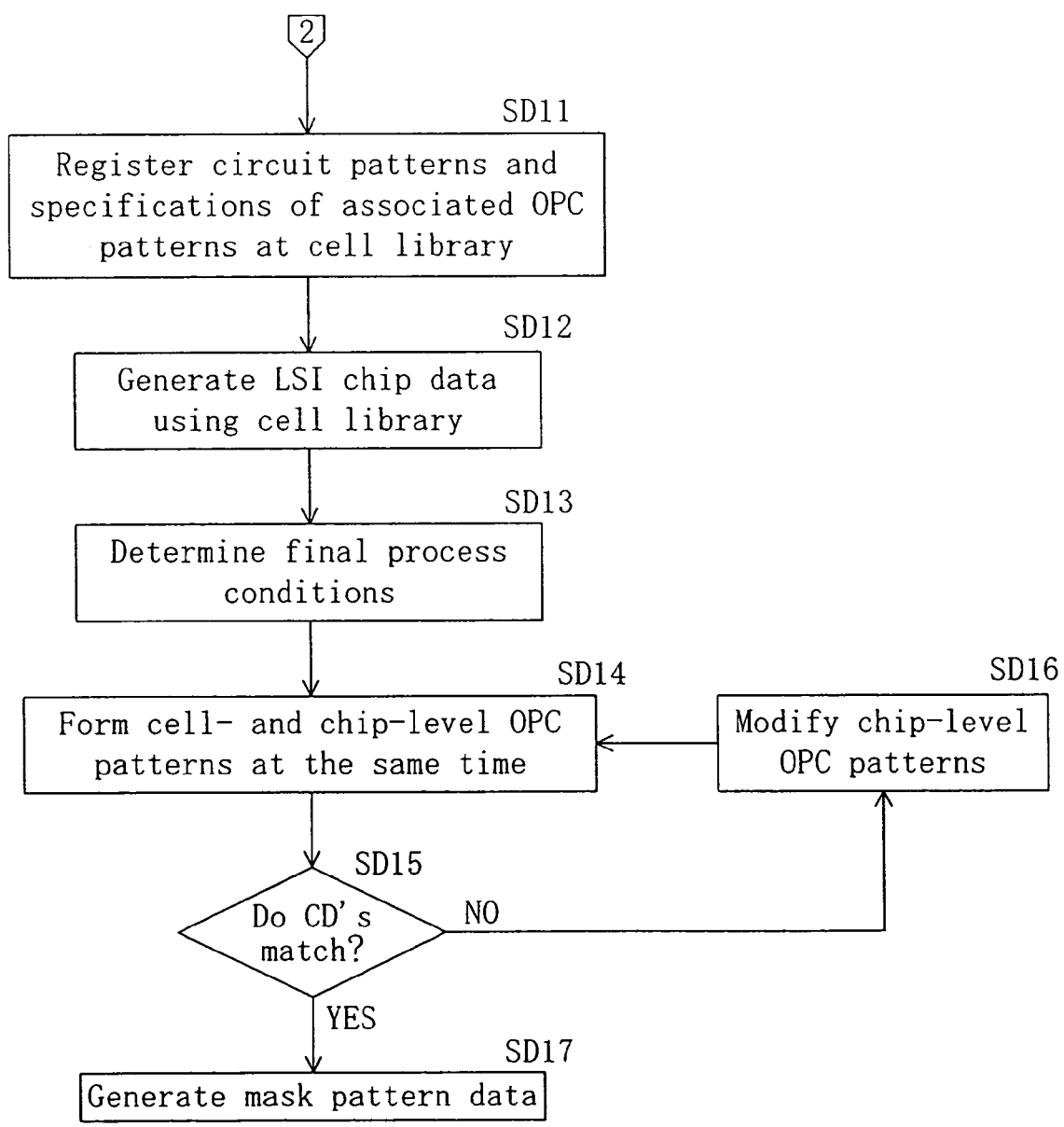

FIGS. 13 and 14 illustrate a processing flow of an LSI mask data generating method according to a modified example of the second embodiment. In the second embodiment, cell-level OPC patterns are directly registered at the cell library in Step SC11. In contrast, according to this modified example, the step of making a cell-level OPC pattern includes the sub-steps of: setting the specification of the cell-level OPC pattern to be made; and making the cell-level OPC pattern to the specifications by a rules-based technique. In this manner, a circuit pattern and the specification of a cell-level OPC pattern associated with the circuit pattern can be registered at the cell library, instead of directly registering the cell-level OPC pattern.

The process steps SD1 through SD10 according to this modified example shown in FIG. 13 are different from the process steps SC1 through SC10 according to the second embodiment in the following respects. Specifically, Step SC5 of making a cell-level OPC pattern for each circuit pattern in FIG. 10 is subdivided into two steps SD5A and SD5B of setting specifications of a cell-level OPC pattern to be made and making the cell-level OPC pattern, respectively, as shown in FIG. 13.

The process steps SD11 through SD17 according to this modified example shown in FIG. 14 are different from the process steps SC11 through SC17 according to the second embodiment in the following respects. Specifically, in Step SD11 of forming a cell library, not the OPC pattern itself, but each circuit pattern and specifications of a cell-level OPC pattern associated with the circuit pattern are registered in combination at the cell library.

In addition, a big difference between this modified example and the second embodiment is that in Step SD14, a cell-level OPC pattern is made to the specifications of the cell-level OPC pattern, and at the same time, a chip-level OPC pattern is also made to specifications of the chip-level OPC pattern by either the rules-based or models-based technique.

According to this modified example, there is no need to process the cell- and chip-level OPC patterns, each being made up of a huge volume of complicated pattern data, until just before the mask data is generated. Thus, that huge volume of data can be processed in a single process step.

Also, a cell to be registered at the cell library needs to represent not only mask data for use in producing a mask but also a circuit configuration. Thus, a pattern to be registered is preferably a circuit pattern representing an expected actual pattern, not the OPC pattern. Furthermore, even when a circuit pattern once registered should be changed, the circuit pattern registered would be more advantageous than an OPC pattern registered.

As described above, according to the second embodiment and its modified example, circuit patterns are classified into the first category strongly affecting a cell area and the second category that does not affect a cell area so much. Thus, a cell-level OPC pattern belonging to the first category can be formed while a cell is being designed. That is to say, a circuit pattern can be designed to make the OPC fully effective and to reduce the cell area as much as possible, or a pattern placement that makes OPC ineffective can be eliminated while each circuit pattern is being designed. Accordingly, once a target cell area has been attained, there can be neither hardly-realizable circuit pattern nor circuit pattern with unnecessarily large margin. As a result, an expected yield of normally operating LSI's can be increased while minimizing a cell area to its target value.

Embodiment 3

Hereinafter, a third embodiment of the present invention will be described with reference to the accompanying drawings.

According to the third embodiment, an OPC pattern, which is associated with circuit patterns defined by multiple layers, is made in an earlier process step of designing a cell. For example, the OPC pattern for a transistor, which includes a first layer with an active layer pattern and a second layer with a gate pattern overlapping with the active layer pattern, is made earlier than the second embodiment. On the other hand, an OPC pattern, which is associated with circuit patterns defined by a single layer such as a gate pattern, is made in a later process step of processing mask data.

In general, a circuit (or a cell) includes multiple components. Circuit patterns may be laid out in various manners through the placement of these components to form many different types of circuits. Among these circuits, one strongly affecting a cell area is defined by patterns covering multiple layers in most cases, and is rarely defined by single-layer patterns. In an OPC pattern defined by multiple layers, the placement of circuit components is modifiable on a layer-by-layer basis. Thus, if that OPC pattern defined by multiple layers is made as early as at the cell design stage, then the circuit components can be placed to further reduce the cell area.

Figure 15:
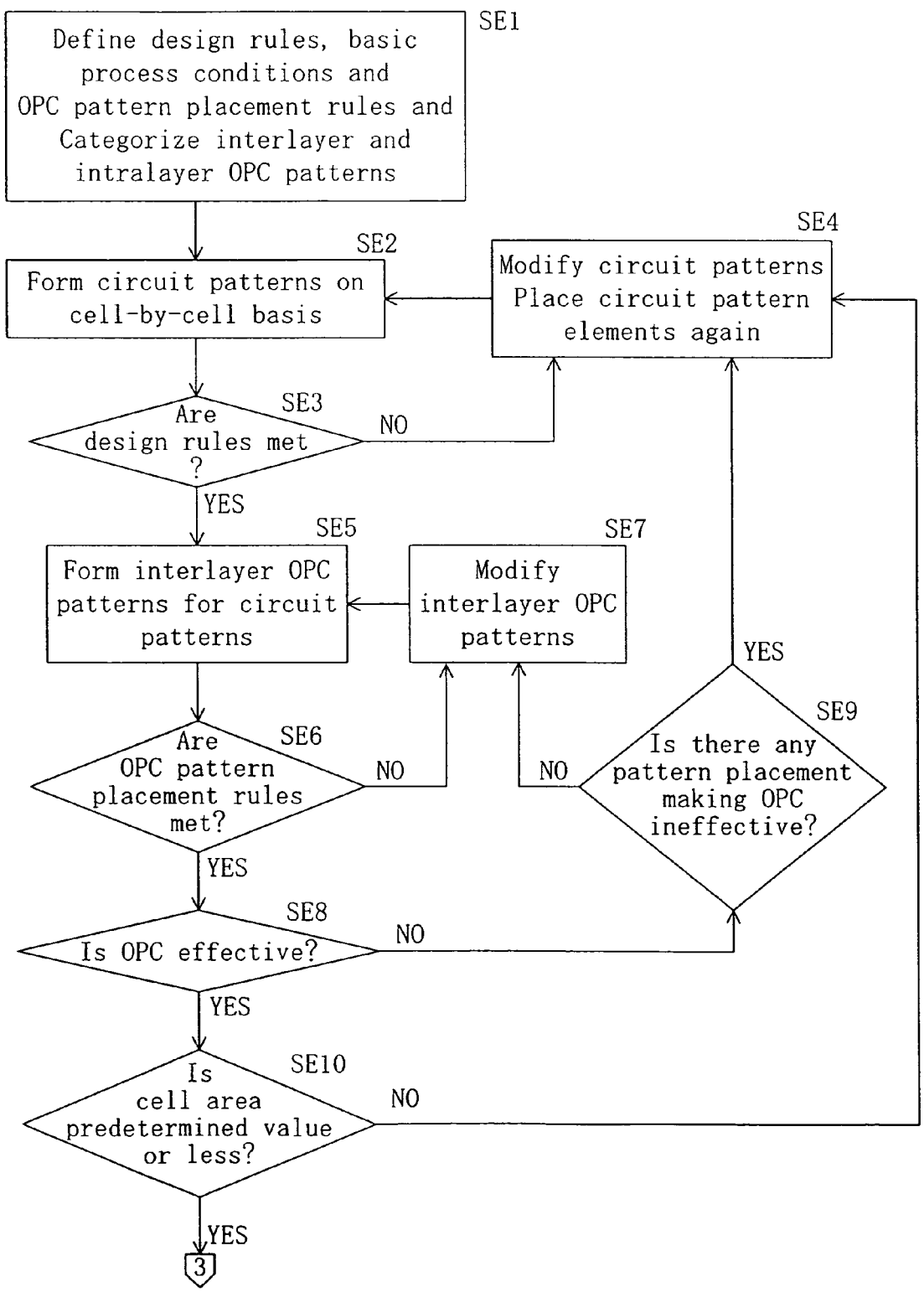
FIGS. 15 and 16 illustrate a flowchart of an LSI mask data generating method according to a third embodiment of the present invention.
Figure 16:
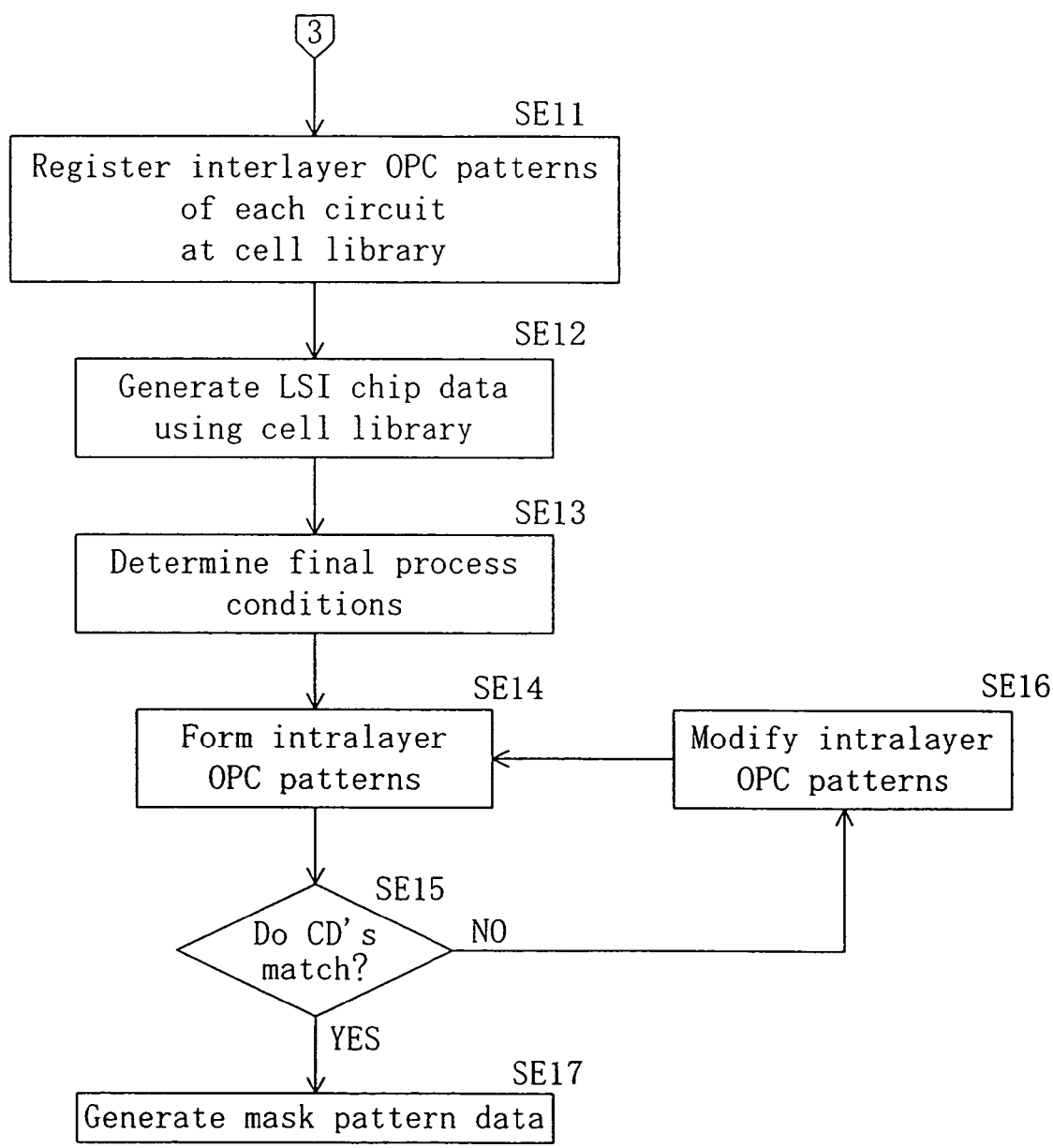

FIGS. 15 and 16 illustrate a processing flow of an LSI mask data generating method according to the third embodiment.

First, in Step SE1 shown in FIG. 15, design rules, basic process conditions and OPC pattern placement rules are defined as in Step SC1 of the second embodiment. In addition, an OPC pattern that is defined by multiple layers and will play a key role in determining a cell area (hereinafter, such OPC pattern will be called an "interlayer OPC pattern") is classified as a first category. On the other hand, an OPC pattern defined by a single layer (hereinafter, such an OPC pattern will be called an "intralayer OPC pattern") is classified as a second category.

Next, in Steps SE2, SE3 and SE4, respective circuit patterns are formed and it is determined whether or not each of these circuit patterns meets the design rules. Then, in Step SE5, the interlayer OPC patterns are made for each cell.

Hereinafter, the interlayer OPC patterns will be described with reference to the accompanying drawings.

Figure 17A:
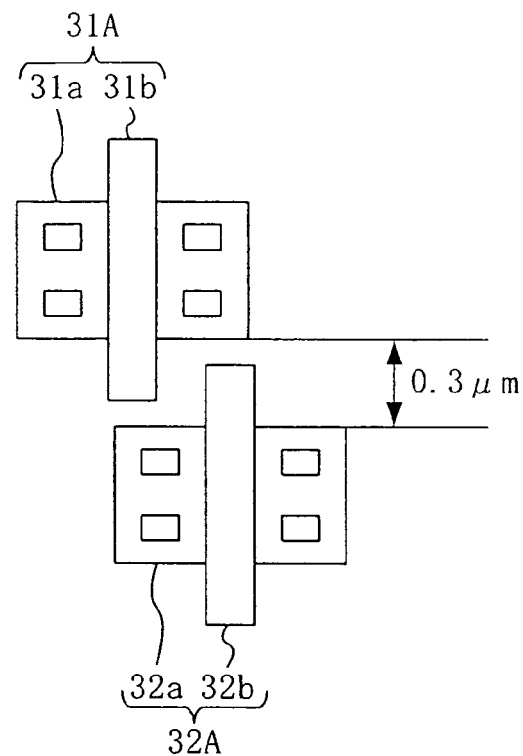
FIGS. 17(a) and 17(b) illustrate patterns used to exemplify categories adopted in the LSI mask data generating method according to the third embodiment.
Figure 17B:
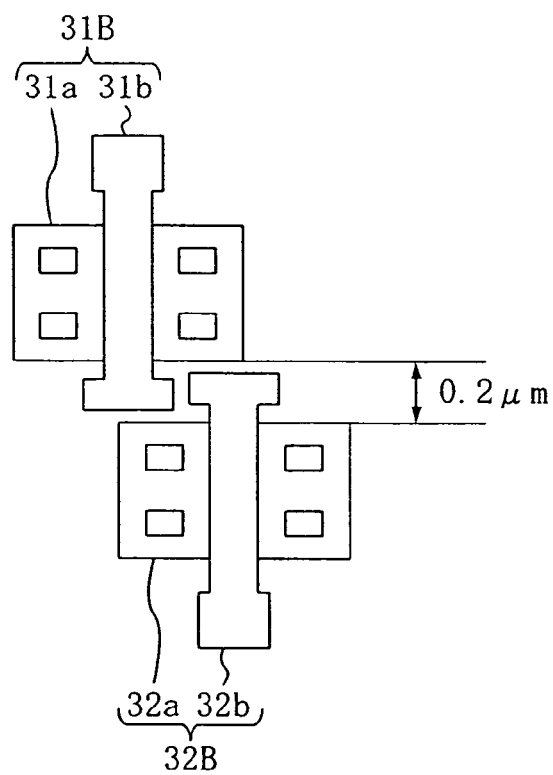

FIG. 17(a) shows a planar layout for a transistor circuit illustrating circuit patterns according to this embodiment, while FIG. 17(b) shows a planar layout for a transistor circuit illustrating interlayer OPC patterns corresponding to the circuit patterns shown in FIG. 17(a). As shown in FIG. 17(a), first and second circuit patterns 31A and 32A are placed in this transistor circuit. Each of the first and second circuit patterns 31A and 32A includes a rectangular active layer pattern 31a, 32a and a gate layer pattern 31b, 32b overlapping the center of the longer sides of the active layer pattern 31a, 32a. A longer side of one active layer pattern 31a is spaced apart from the adjacent longer side of the other active layer pattern 32a by about 0.3 µm. Also, the gate layer patterns 31b and 32b are placed such that their adjacent edges do not overlap with each other, but are spaced to face each other.

In this manner, the first circuit pattern 31A has a region in which the gate layer pattern 31b overlaps with the active layer pattern 31a. Thus, if the active layer pattern 31a is formed in a semiconductor substrate, then a channel region is defined in the overlapping region, thereby making the circuit pattern 31A operate as a transistor. Accordingly, there is a placement rule to be followed by the active layer pattern 31a and the gate layer pattern 31b. In other words, if one of the active layer and gate layer patterns 31a and 31b has changed its location, then both of these patterns 31a and 31b are mutually affected. The same statement is equally applicable to the second circuit pattern 32A.

First and second OPC patterns 31B and 32B shown in FIG. 17(b) correspond to the first and second circuit patterns 31A and 32A shown in FIG. 17(a), respectively. As shown in FIG. 17(b), hammerhead patterns in different shapes are added to both edges of each gate layer pattern 31b, 32b. More specifically, the hammerhead patterns added to the closely placed edges of the gate layer patterns 31b and 32b are smaller in area than those added to the other edges of the gate layer patterns 31b and 32b such that the active layer patterns 31a and 32a in the OPC patterns are spaced apart by 0.2 µm, which is smaller than that of the circuit patterns.

Although not shown, as for a contact pattern formed to interconnect together lines included in mutually different layers, line OPC patterns made from line patterns and a contact OPC pattern made from the contact pattern are defined by multiple layers.

Subsequently, in Steps SE6, SE8 and SE10 shown in FIG. 15, the interlayer OPC pattern obtained is checked as to whether the pattern meets the OPC pattern placement rules, whether the pattern makes the OPC effective, and whether the cell area is the predetermined value or less, respectively. These items may be checked by the methods exemplified in the second embodiment. If the check result is no-go, then the interlayer OPC pattern should be modified in Step SE7 or the circuit pattern is modified layer by layer and the circuit pattern elements are placed again in Step SE4 to make the OPC effective.

Thereafter, in Step SE11 shown in FIG. 16, the interlayer OPC patterns, which have been prepared on the cell-by-cell basis, are registered at a cell library for use to make mask patterns for respective circuit patterns. The circuit patterns belonging to the second category are registered at the cell library as they are. As a result, data about basic circuit components, of which an LSI chip pattern will be made, can be collected.

Next, in Step SE12, data about the circuit patterns needed to fabricate an LSI is extracted from the cell library and LSI chip data is generated using the circuit pattern data extracted. Subsequently, in Step SE13, final process conditions for the realization of the LSI chip data are determined.

Then, in Step SE14, it is estimated more accurately in accordance with the final process conditions how much an actual size would deviate from a mask size due to proximity effects. Based on the results of this estimation, an intralayer OPC pattern belonging to the second category is made. In this case, the OPC pattern may be made by either the rules-based or models-based technique.

Next, in Step SE15, it is determined whether or not the dimensions of an actual pattern that will be made from the intralayer OPC pattern, i.e., critical dimensions (CD), match those of the originally designed circuit pattern. In this case, the CD's are also checked by some simulation technique that can reproduce a real circuit precisely. It should be noted, however, that it is not necessary to check the CD for each and every part of a single circuit pattern. In actuality, the CD's have to be checked in only a portion of a circuit pattern, where the actual size should exactly match the designed size. If it has been determined that the CD's are not equal to each other, then the method proceeds to Step SE16, in which the intralayer OPC pattern is further modified to eliminate the portions in question from the OPC pattern. Then, Steps SE14 and SE15 are repeatedly performed. It should be noted that if the models-based technique is applied in Step SE14, then the CD's do not have to be checked.

Finally, in Step SE17, mask pattern data is generated using the interlayer and intralayer OPC patterns. Based on the mask pattern data obtained in this manner, a mask or reticle is produced and a pattern that will make a resulting circuit fully operative can be transferred onto a resist film on a semiconductor substrate, for example, by using the mask or reticle.

In the foregoing embodiment, the intralayer OPC pattern belonging to the second category is made in Step SE14 after LSI chip data has been defined in Step SE12. However, the cell-level OPC patterns classified as the first category according to the second embodiment are also included in the intralayer OPC patterns. Accordingly, such a circuit, for which those cell-level OPC patterns are made, may be designed in Step SE2.

Modified Example of Embodiment 3

Hereinafter, a modified example of the third embodiment will be described with reference to the accompanying drawings.

Figure 18:
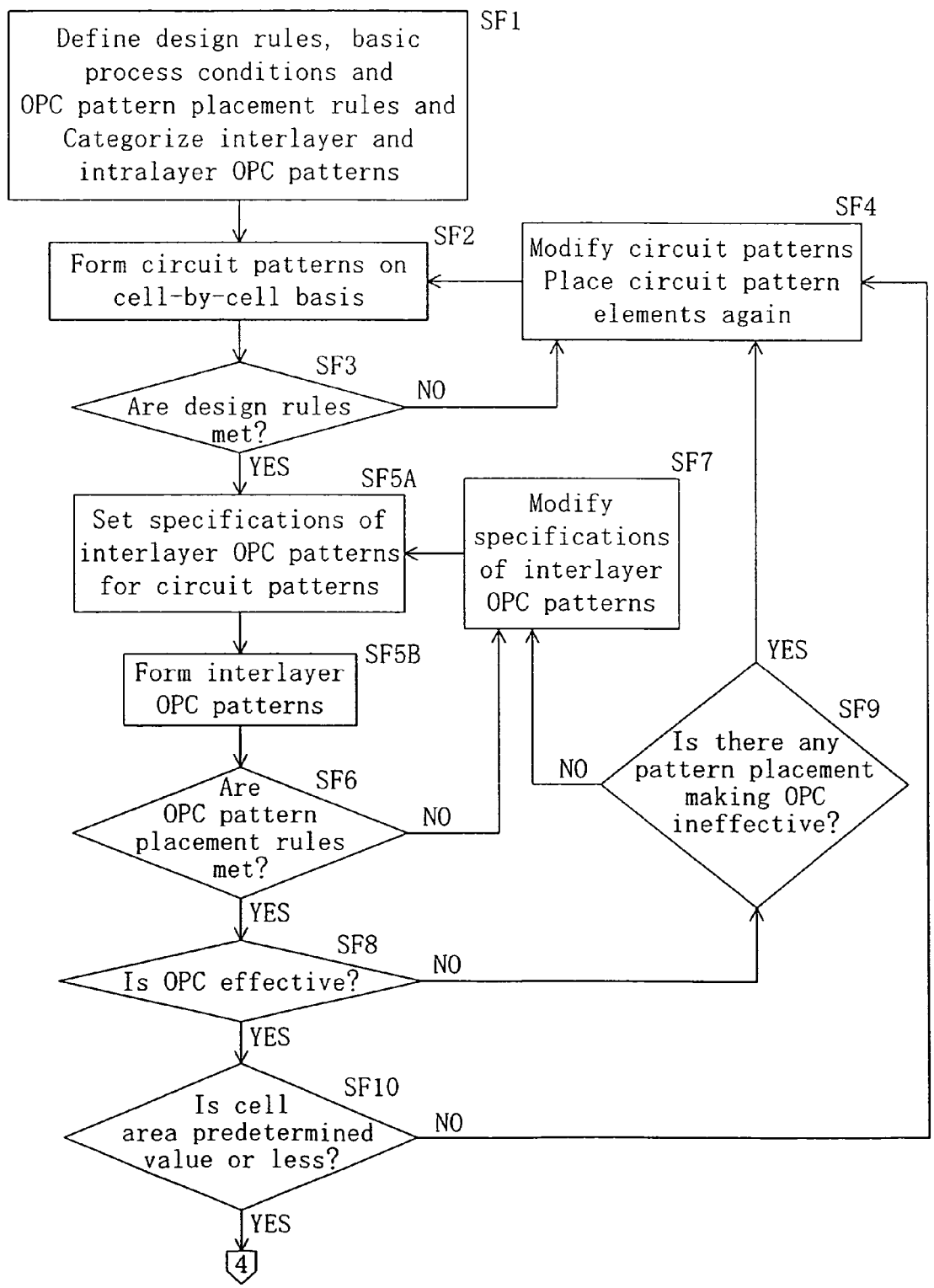
FIGS. 18 and 19 illustrate a flowchart of an LSI mask data generating method according to a modified example of the third embodiment.
Figure 19:
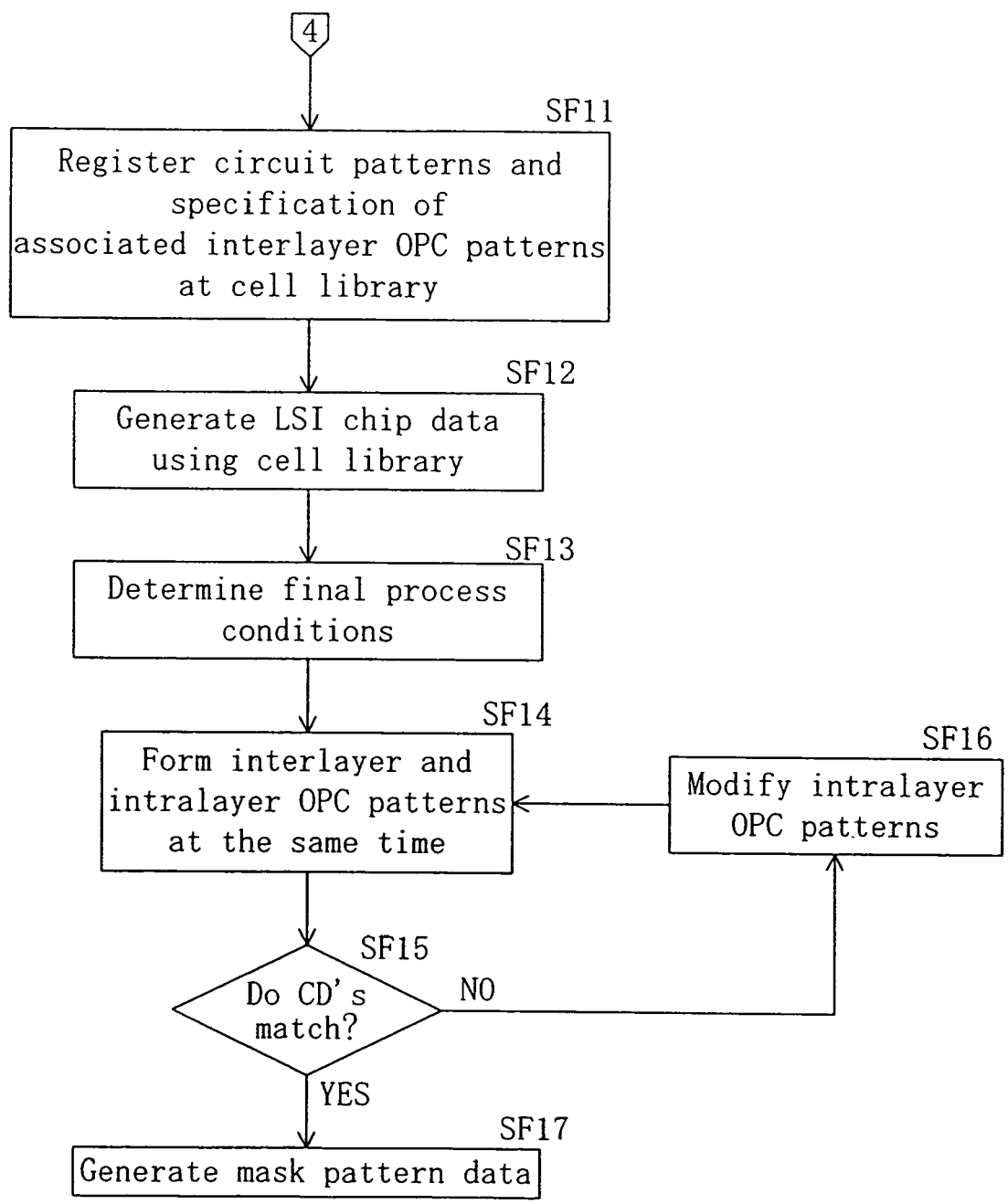
Figure 20A:
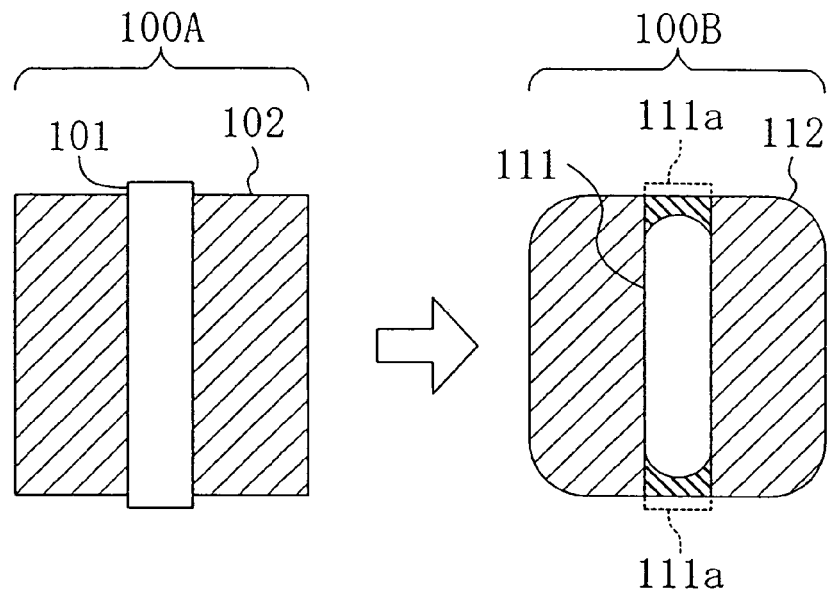
FIGS. 20(a) and 20(b) are plan views illustrating originally designed and actually transferred patterns for a transistor according to a conventional LSI mask data generating method.
Figure 20B:
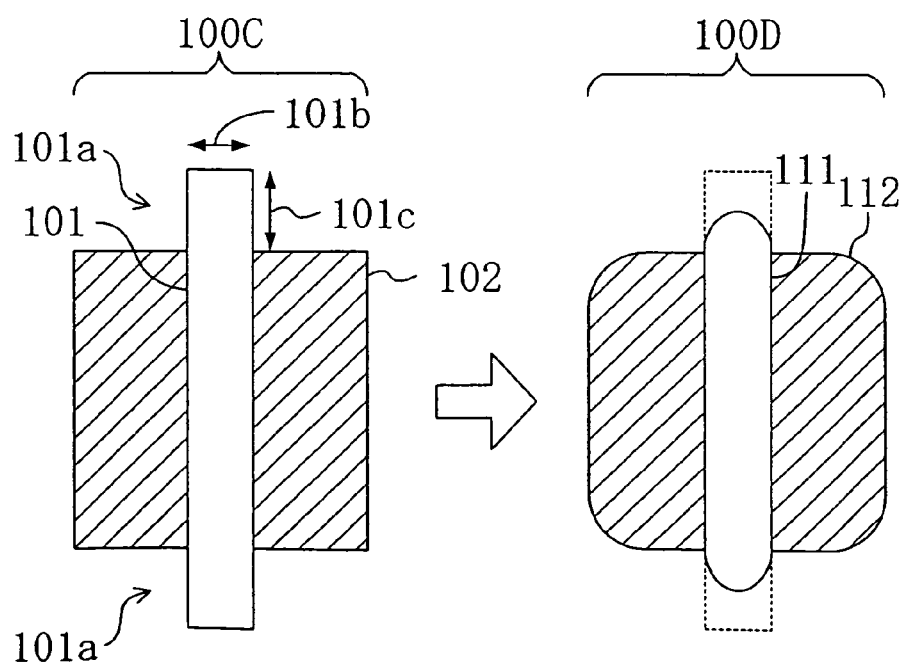

FIGS. 18 and 19 illustrate a processing flow of an LSI mask data generating method according to a modified example of the third embodiment. In the third embodiment, interlayer OPC patterns are directly registered at the cell library in Step SE11. In contrast, according to this modified example, the step of making an interlayer OPC pattern by the rules-based technique includes the sub-steps of: setting the specification of the interlayer OPC pattern to be made; and making the interlayer OPC pattern to the specifications.

In this manner, a circuit pattern and the specification of an interlayer OPC pattern associated with the circuit pattern can be registered at the cell library, instead of directly registering the interlayer OPC pattern.

The process steps SF1 through SF10 according to this modified example shown in FIG. 18 are different from the process steps SE1 through SE10 according to the third embodiment shown in FIG. 15 in the following respects. Specifically, Step SE5 of making an interlayer OPC pattern in FIG. 15 is subdivided into two steps SF5A and SF5B of setting specifications of an interlayer OPC pattern to be made for each circuit (or cell) and making the interlayer OPC pattern, respectively, as shown in FIG. 18.

The process steps SF11 through SF17 according to this modified example shown in FIG. 19 are different from the process steps SE11 through SE17 according to the third embodiment in the following respects. Specifically, in Step SF11 of forming a cell library, not the OPC pattern itself, but each circuit pattern and specifications of an interlayer OPC pattern associated with the circuit pattern are registered in combination at the cell library.

In addition, a big difference between this modified example and the third embodiment is that in Step SF14, an interlayer OPC pattern is made to the specifications of the interlayer OPC pattern, and at the same time, an intralayer OPC pattern is also made to specifications of the intralayer OPC pattern by either the rules-based or models-based technique.

According to this modified example, there is no need to process the interlayer and intralayer OPC patterns, each being made up of a huge volume of complicated pattern data, until just before the mask data is generated. Thus, that large volume of data can be processed in a single process step.

Also, a cell to be registered at the cell library needs to represent not only mask data for use in producing a mask but also a circuit configuration. Thus, a pattern to be registered is preferably a circuit pattern representing an expected actual pattern, not the OPC pattern. Furthermore, even when a circuit pattern once registered should be changed, the circuit pattern registered would be more advantageous than an OPC pattern registered.

As described above, according to the third embodiment and its modified example, circuit patterns are classified into the first category strongly affecting a cell area and the second category that does not affect a cell area so much. Thus, an interlayer OPC pattern belonging to the first category can be formed while a cell is being designed. That is to say, a circuit pattern can be designed to make the OPC fully effective and to reduce a cell area as much as possible, or a pattern placement that makes OPC ineffective can be eliminated while each circuit pattern is being designed. Accordingly, once a target cell area has been attained, there can be neither hardly-realizable circuit pattern nor circuit pattern with unnecessarily large margin. As a result, an expected yield of normally operating LSI's can be increased while minimizing a cell area to its target value.

In Steps SE4 and SF4, a tool called "compactor" may be used for placing circuit pattern elements again. In such a case, there is no need to repeatedly perform check and modification as is done in the third embodiment. Furthermore, if the compactor is made to obey a rule, which should be followed to perform OPC fully effectively using the interlayer OPC pattern, during the re-placement, then cell patterns can also be synthesized automatically.

What is claimed is:

1. A method for generating mask data for an LSI, comprising the steps of:
    a) classifying multiple circuit patterns included in the LSI into first and second groups of corrected patterns, where each said corrected pattern of the first group is defined by circuit patterns placed to cover multiple layers, while each said corrected pattern of the second group is defined by circuit patterns placed within a single layer;
    b) setting specifications of interlayer optical proximity corrected patterns to be made for the first group of corrected patterns;
    c) designing the circuit patterns;
    d) evaluating effectiveness of optical proximity corrections if the interlayer corrected patterns, which have been made for the first group of corrected patterns to the specifications of the interlayer corrected patterns, are used;
    if the effectiveness of the corrections is negated,
    e) modifying ineffective circuit patterns to make the corrections effective and re-evaluating effectiveness of the corrections;
    if the effectiveness of the corrections is affirmed,
    f) registering the circuit patterns, belonging to the first and second groups of corrected patterns, at a cell library;
    g) generating chip-level pattern data from the circuit patterns that have been registered at the cell library;
    h) setting specifications of intralayer optical proximity corrected patterns to be made for the second group of corrected patterns;
    i) generating interlayer optical proximity corrected pattern data from the circuit patterns belonging to the first group of corrected patterns according to the specifications of the interlayer corrected patterns; and
    j) generating intralayer optical proximity corrected pattern data from the circuit patterns belonging to the second group of corrected patterns according to the specifications of the intralayer corrected patterns.

2. The method of claim 1, wherein if the corrections are effectively applicable to multiple layouts for circuit patterns, the step d) includes the step of selecting one of the layouts that results in a circuit area equal to or smaller than a predetermined value.

3. The method of claim 1, wherein the specifications of the interlayer corrected patterns to be made are determined by a placement rule defining a layer including a gate of a transistor and another layer including an active region.

4. The method of claim 1, wherein the specifications of the interlayer corrected patterns to be made are determined by a placement rule defining a first interconnection layer and another layer including a contact for electrically connecting the first interconnection layer to a second interconnection layer.

5. The method of claim 1, wherein the step d) includes the step of determining whether or not an expected actual size falls within a predetermined range by performing a process simulation including at least one of lithography and etching process steps.

6. A method for generating mask data for an LSI, comprising the steps of:
    a) classifying multiple circuit patterns included in the LSI into first and second groups of corrected patterns, where each said corrected pattern of the first group is defined by circuit patterns placed to cover multiple layers, while each said corrected pattern of the second group is defined by circuit patterns placed within a single layer;
    b) setting specifications of interlayer optical proximity corrected patterns to be made for the first group of corrected patterns;
    c) designing the circuit patterns;
    d) evaluating effectiveness of optical proximity corrections if the interlayer corrected patterns, which have been made for the first group of corrected patterns to the specifications of the interlayer corrected patterns, are used;
    if the effectiveness of the corrections is negated,
    e) modifying ineffective circuit patterns or the specifications of the interlayer corrected patterns corresponding to the circuit patterns to make the corrections effective and re-evaluating effectiveness of the corrections;
    if the effectiveness of the corrections is affirmed,
    f) registering not only the circuit patterns belonging to the first group of corrected patterns and the specifications of the interlayer corrected patterns corresponding to the circuit patterns, but also the circuit patterns belonging to the second group of corrected patterns at a cell library;
    g) generating chip-level pattern data from the circuit patterns that have been registered at the cell library;
    h) generating interlayer optical proximity corrected pattern data from the circuit patterns belonging to the first group of corrected patterns according to the specifications of the interlayer corrected patterns; and
    i) generating intralayer optical proximity corrected pattern data from the circuit patterns belonging to the second group of corrected patterns according to the specifications of the intralayer corrected patterns.

7. The method of claim 6, wherein if the corrections are effectively applicable to multiple layouts for circuit patterns, the step d) includes the step of selecting one of the layouts that results in a circuit area equal to or smaller than a predetermined value.

8. The method of claim 6, wherein the specifications of the interlayer corrected patterns to be made are determined by a placement rule defining a layer including a gate of a transistor and another layer including an active region.

9. The method of claim 6, wherein the specifications of the interlayer corrected patterns to be made are determined by a placement rule defining a first interconnection layer and another layer including a contact for electrically connecting the first interconnection layer to a second interconnection layer.

10. The method of claim 6, wherein the step d) includes the step of determining whether or not an expected actual size falls within a predetermined range by performing a process simulation including at least one of lithography and etching process steps.

11. A method for forming an LSI pattern, comprising the steps of:
    a) classifying multiple circuit patterns included in an LSI into first and second groups of corrected patterns, where each said corrected pattern of the first group is defined by circuit patterns placed to cover multiple layers, while each said corrected pattern of the second group is defined by circuit patterns placed within a single layer;
    b) setting specifications of interlayer optical proximity corrected patterns to be made for the first group of corrected patterns;
    c) designing the circuit patterns;

d) evaluating effectiveness of optical proximity corrections if the interlayer corrected patterns, which have been made for the first group of corrected patterns to the specifications of the interlayer corrected patterns, are used;

if the effectiveness of the corrections is negated, e) modifying ineffective circuit patterns to make the corrections effective and re-evaluating effectiveness of the corrections;

if the effectiveness of the corrections is affirmed, f) registering the circuit patterns, belonging to the first and second groups of corrected patterns, at a cell library;

g) generating chip-level pattern data from the circuit patterns that have been registered at the cell library;

h) setting specifications of intralayer optical proximity corrected patterns to be made for the second group of corrected patterns;

i) generating interlayer optical proximity corrected pattern data from the circuit patterns belonging to the first group of corrected patterns according to the specifications of the interlayer corrected patterns;

j) generating intralayer optical proximity corrected pattern data from the circuit patterns belonging to the second group of corrected patterns according to the specifications of the intralayer corrected patterns;

k) producing a mask using the interlayer and intralayer optical proximity corrected pattern data generated; and l) defining the circuit patterns on a semiconductor substrate using the mask produced.

12. A method for forming an LSI pattern, comprising the steps of:

a) classifying multiple circuit patterns included in an LSI into first and second groups of corrected patterns, where each said corrected pattern of the first group is defined by circuit patterns placed to cover multiple layers, while each said corrected pattern of the second group is defined by circuit patterns placed within a single layer;

b) setting specifications of interlayer optical proximity corrected patterns to be made for the first group of corrected patterns;

c) designing the circuit patterns;

d) evaluating effectiveness of optical proximity corrections if the interlayer corrected patterns, which have been made for the first group of corrected patterns to the specifications of the interlayer corrected patterns, are used;

if the effectiveness of the corrections is negated, e) modifying ineffective circuit patterns or the specifications of the interlayer corrected patterns corresponding to the circuit patterns to make the corrections effective and re-evaluating effectiveness of the corrections;

if the effectiveness of the corrections is affirmed, f) registering not only the circuit patterns belonging to the first group of corrected patterns and the specifications of the interlayer corrected patterns corresponding to the circuit patterns, but also the circuit patterns belonging to the second group of corrected patterns at a cell library;

g) generating chip-level pattern data from the circuit patterns that have been registered at the cell library;

h) generating interlayer optical proximity corrected pattern data from the circuit patterns belonging to the first group of corrected patterns according to the specifications of the interlayer corrected patterns;

i) generating intralayer optical proximity corrected pattern data from the circuit patterns belonging to the second group of corrected patterns according to the specifications of the intralayer corrected patterns;

j) producing a mask using the interlayer and intralayer optical proximity corrected pattern data generated; and k) defining the circuit patterns on a semiconductor substrate using the mask produced.

\* \* \* \* \*